(12) United States Patent
Saito et al.

(10) Patent No.: US 9,916,630 B2
(45) Date of Patent: Mar. 13, 2018

(54) ELECTRICITY SUPPRESSING TYPE ELECTRICITY AND HEAT OPTIMIZING CONTROL DEVICE, OPTIMIZING METHOD, AND OPTIMIZING PROGRAM

(71) Applicant: Kabushiki Kaisha Toshiba, Minato-ku (JP)

(72) Inventors: Masaaki Saito, Itabashi-ku (JP); Dai Murayama, Musashino (JP); Yutaka Iino, Kawasaki (JP); Masahiko Murai, Hachioji (JP); Nagako Hisada, Koganei (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 727 days.

(21) Appl. No.: 14/201,382

(22) Filed: Mar. 7, 2014

(65) Prior Publication Data
US 2014/0188295 A1 Jul. 3, 2014

Related U.S. Application Data

(63) Continuation of application No. PCT/JP2013/079989, filed on Nov. 6, 2013.

(30) Foreign Application Priority Data

Nov. 9, 2012 (JP) .................................. 2012-247928

(51) Int. Cl.
*G05D 3/12* (2006.01)
*G05D 5/00* (2006.01)
(Continued)

(52) U.S. Cl.
CPC ............. *G06Q 50/06* (2013.01); *G05B 15/02* (2013.01); *G06Q 10/0631* (2013.01); *H02J 3/32* (2013.01);
(Continued)

(58) Field of Classification Search
CPC ....... G06Q 50/06; G06Q 10/0631; H02J 3/32; H02J 3/383; H02J 7/35; H02J 2003/146;
(Continued)

(56) References Cited

U.S. PATENT DOCUMENTS 6,774,506 B2   8/2004   Hashimoto et al.
7,190,149 B2   3/2007   Huff et al.
(Continued)

FOREIGN PATENT DOCUMENTS

AU   2010 204 729 A1   9/2011
CN         1737838 A   2/2006
(Continued)

OTHER PUBLICATIONS

International Search Report dated Jan. 21, 2014 for PCT/JP2013/079989 filed on Nov. 6, 2013 with English Translation of Categories.
(Continued)

*Primary Examiner* — Ziaul Karim
(74) *Attorney, Agent, or Firm* — Oblon, McClelland, Maier & Neustadt, L.L.P.

(57) ABSTRACT

An optimized operating schedule is obtained while avoiding a complexity of formulation and optimization in response to an incentive type demand response. A device includes an energy predictor setting a predicted value of energy of a control-target device within a predetermined future period, a schedule optimizer optimizing the operating schedule of the control-target device within the predetermined period in accordance with a predetermined evaluation barometer, an incentive acceptance determiner determining a time with a possibility that an incentive is receivable, an electricity suppressing schedule optimizer optimizing, for a time with a possibility that the incentive is receivable, the operating schedule of the control-target device based on a unit price of (Continued)

electricity fee having a unit price for calculating the incentive taken into consideration, and an adopted schedule selector selecting either one of the operating schedules.

11 Claims, 16 Drawing Sheets

(51) Int. Cl.
<table>
<tr><td>G05D 9/00</td><td>(2006.01)</td></tr>
<tr><td>G06Q 50/06</td><td>(2012.01)</td></tr>
<tr><td>G06Q 10/06</td><td>(2012.01)</td></tr>
<tr><td>H02J 3/32</td><td>(2006.01)</td></tr>
<tr><td>G05B 15/02</td><td>(2006.01)</td></tr>
<tr><td>H02J 3/38</td><td>(2006.01)</td></tr>
<tr><td>H02J 7/35</td><td>(2006.01)</td></tr>
<tr><td>H02J 3/14</td><td>(2006.01)</td></tr>
</table>

(52) U.S. Cl.
CPC ............. *H02J 3/383* (2013.01); *H02J 7/35* (2013.01); *H02J 2003/146* (2013.01); *Y02E 10/563* (2013.01); *Y02E 10/566* (2013.01); *Y02E 70/30* (2013.01); *Y02P 80/11* (2015.11); *Y02P 90/50* (2015.11)

(58) Field of Classification Search
CPC ..... Y02E 10/563; Y02E 10/566; Y02E 70/30; Y02P 80/11; Y04S 10/54
USPC ........................................................ 700/291
See application file for complete search history.

(56) References Cited

U.S. PATENT DOCUMENTS

<table>
<tr><td>7,288,921 B2</td><td>10/2007</td><td>Huff et al.</td></tr>
<tr><td>7,385,300 B2</td><td>6/2008</td><td>Huff et al.</td></tr>
<tr><td>7,474,080 B2</td><td>1/2009</td><td>Huff et al.</td></tr>
<tr><td>8,019,697 B2</td><td>9/2011</td><td>Ozog</td></tr>
<tr><td>8,364,609 B2 *</td><td>1/2013</td><td>Ozog ............. G06Q 10/06315<br>705/412</td></tr>
<tr><td>8,364,809 B2</td><td>1/2013</td><td>Hetrick et al.</td></tr>
<tr><td>8,498,748 B2</td><td>7/2013</td><td>Murai et al.</td></tr>
<tr><td>8,612,062 B2</td><td>12/2013</td><td>Iino et al.</td></tr>
<tr><td>9,159,042 B2 *</td><td>10/2015</td><td>Steven ............. G06Q 10/06315</td></tr>
<tr><td>2005/0285574 A1</td><td>12/2005</td><td>Huff et al.</td></tr>
<tr><td>2005/0286179 A1</td><td>12/2005</td><td>Huff et al.</td></tr>
<tr><td>2007/0162189 A1</td><td>7/2007</td><td>Huff et al.</td></tr>
<tr><td>2007/0300214 A1</td><td>12/2007</td><td>Chang et al.</td></tr>
<tr><td>2008/0004721 A1</td><td>1/2008</td><td>Huff et al.</td></tr>
<tr><td>2010/0106342 A1 *</td><td>4/2010</td><td>Ko ..................... G06Q 10/04<br>700/295</td></tr>
<tr><td>2010/0179704 A1 *</td><td>7/2010</td><td>Ozog ............... G06Q 10/06315<br>700/291</td></tr>
<tr><td>2011/0029461 A1 *</td><td>2/2011</td><td>Hardin, Jr. ............. G06Q 10/10<br>705/412</td></tr>
<tr><td>2011/0035073 A1</td><td>2/2011</td><td>Ozog</td></tr>
<tr><td>2011/0078092 A1 *</td><td>3/2011</td><td>Kim .................... B60L 11/1824<br>705/412</td></tr>
<tr><td>2011/0270459 A1</td><td>3/2011</td><td>Murai et al.</td></tr>
<tr><td>2011/0179704 A1</td><td>7/2011</td><td>MacFarlane</td></tr>
<tr><td>2011/0204720 A1 *</td><td>8/2011</td><td>Ruiz ................... B60L 11/1816<br>307/66</td></tr>
<tr><td>2011/0218691 A1 *</td><td>9/2011</td><td>O'Callaghan .......... G06Q 10/06<br>700/296</td></tr>
<tr><td>2013/0144451 A1 *</td><td>6/2013</td><td>Kumar .................... G05B 13/02<br>700/291</td></tr>
<tr><td>2013/0173075 A1</td><td>7/2013</td><td>Mitsumoto et al.</td></tr>
<tr><td>2014/0039965 A1 *</td><td>2/2014</td><td>Steven ............. G06Q 10/06315<br>705/7.25</td></tr>
<tr><td>2014/0067142 A1 *</td><td>3/2014</td><td>Steven ................... G06Q 10/00<br>700/291</td></tr>
</table>

FOREIGN PATENT DOCUMENTS

<table>
<tr><td>CN</td><td>102437573 A</td><td>5/2012</td></tr>
<tr><td>CN</td><td>102545258 A</td><td>7/2012</td></tr>
<tr><td>CN</td><td>102611127 A</td><td>7/2012</td></tr>
<tr><td>CN</td><td>102684199 A</td><td>9/2012</td></tr>
<tr><td>JP</td><td>2002-176729 A</td><td>6/2002</td></tr>
<tr><td>JP</td><td>2003-087969 A</td><td>3/2003</td></tr>
<tr><td>JP</td><td>3519321 B2</td><td>4/2004</td></tr>
<tr><td>JP</td><td>2005-157685 A</td><td>6/2005</td></tr>
<tr><td>JP</td><td>2005-257097 A</td><td>9/2005</td></tr>
<tr><td>JP</td><td>3763767 B2</td><td>1/2006</td></tr>
<tr><td>JP</td><td>2006-098361 A</td><td>4/2006</td></tr>
<tr><td>JP</td><td>2007-336655 A</td><td>12/2007</td></tr>
<tr><td>JP</td><td>2010-108471 A</td><td>5/2010</td></tr>
<tr><td>JP</td><td>2011-059939 A</td><td>3/2011</td></tr>
<tr><td>JP</td><td>2011-142753 A</td><td>7/2011</td></tr>
<tr><td>JP</td><td>2013-141331 A</td><td>7/2013</td></tr>
<tr><td>JP</td><td>2013-174412 A</td><td>9/2013</td></tr>
<tr><td>WO</td><td>WO 2012/145563 A1</td><td>10/2012</td></tr>
</table>

OTHER PUBLICATIONS

International Written Opinion dated Jan. 21, 2014 for PCT/JP2013/079989 filed on Nov. 6, 2013.
Search Report and Written Opinion dated Apr. 7, 2015 in Singaporean Patent Application No. 11201400385V.
U.S. Appl. No. 13/822,783, filed Mar. 13, 2013, Saito et al.
Combined Office Action and Search Report dated Apr. 26, 2016 in Chinese Patent Application No. 201380002709.9.
Extended Search Report dated Apr. 26, 2016 in European Patent Application No. 13834286.0.

* cited by examiner

| VARIABLE NAME | PHYSICAL QUANTITY | UPPER AND LOWER LIMITS | UNIT |
|---|---|---|---|
| $X1$ | ELECTRICITY USAGE | $0 \leq X1 \leq$ CONTRACTED ELECTRICITY | [kWh] |
| $X2$ | ABSORPTION WATER COOLER/ HEATER LOAD FACTOR (EXHAUST HEAT LOADING MODE) | LOWER LIMIT $\leq X2 \leq 1$ | - |
| $X3$ | ABSORPTION WATER COOLER/ HEATER LOAD FACTOR (PRODUCING COLD WATER USING GAS) | LOWER LIMIT $\leq X3 \leq 1$ | - |
| $X4$ | ABSORPTION WATER COOLER/ HEATER LOAD FACTOR (PRODUCING HOT WATER USING GAS) | LOWER LIMIT $\leq X4 \leq 1$ | - |
| $X5$ | ELECTRIC FREEZER LOAD FACTOR | LOWER LIMIT $\leq X5 \leq 1$ | - |
| $X6$ | CGS LOAD FACTOR | LOWER LIMIT $\leq X6 \leq 1$ | - |
| $X7$ | REMAINING HEAT STORAGE QUANTITY | $0 \leq X7 \leq$ HEAT STORAGE CAPACITY | [kWh] |
| $X8$ | SOC (State of Charge: REMAINING ELECTRICITY STORAGE QUANTITY) | $0 \leq X8 \leq$ ELECTRIC STORAGE VALUE CAPACITY | [kWh] |

*FIG. 8*

ELECTRICITY SUPPRESSING TYPE ELECTRICITY AND HEAT OPTIMIZING CONTROL DEVICE, OPTIMIZING METHOD, AND OPTIMIZING PROGRAM

CROSS-REFERENCE TO RELATED APPLICATIONS

This application is a Continuation of PCT Application No. PCT/JP2013/079989, filed on Nov. 6, 2013, and claims priority to Japanese Patent Application No. 2012-247928, filed on Nov. 9, 2012, the entire contents of both of which are incorporated herein by reference.

TECHNICAL FIELD

The embodiments of the present disclosure relate to technologies of optimizing an operating schedule of control-target devices in, for example, a building and a factory, such as an energy supplying device, an energy consuming device, and an energy storing device.

BACKGROUND ART

Consumed energy by commercial operations division in architectures like buildings in Japan is 20% or so of the whole final energy consumption. Hence, if the manager of the buildings and the users thereof can continuously accomplish energy saving, it is effective to suppress the final energy consumption.

In addition, in response to the recent electricity demand tightness, the needs for a peak cut which reduces the consumed energy in a time slot at which the demand becomes maximum are becoming high. For example, an upper limit of electricity usage is placed on a large consumer like a building. Still further, the needs for a peak shift which utilizes batteries and heat storing devices to shift the time at which the energy consumption becomes maximum are also becoming high.

In view of such circumstances, in order to suppress the energy consumption, it is expected that introduction of energy supplying devices utilizing renewable energies, such as solar light and solar heat, will be further accelerated in future.

However, the output by the energy supplying devices utilizing the renewable energy varies depending on a meteorological phenomenon condition like weather. Hence, it is expected that introduction of energy storing devices that compensate such variance, such as batteries and heat storing devices, will increase in future.

Based on the above factors, it is expected that the energy supplying devices and the energy storing devices installed in facilities like buildings will be diversified. Accordingly, a planning scheme becomes necessary for an operating schedule to appropriately link those devices with conventional devices, etc., and to accomplish an effective operation in the whole architecture.

For example, there is a scheme that minimizes the consumed energy, the costs, and the $CO_2$ generating quantity within a predetermined time period for energy supplying facilities including a heat storage tank.

In addition, there are also a scheme of performing a peak cut based on a prediction of an air conditioner load, and a scheme of utilizing an ice heat storing air conditioner to a peak cut.

SUMMARY OF INVENTION

Technical Problem

The above-explained technologies can realize, for energy supplying facilities including a heat storage tank, the creation and control of an operating schedule that realizes the minimization of the costs charged in accordance with the usage of electricity and gas, and $CO_2$ and the reduction of electricity consumption in the peak time.

Conversely, in response to the above-explained electricity demand tightness, introduction of demand response (hereinafter, referred to as DR in some cases) that prompts the electricity usage suppression to consumers from the exterior like an electricity company is gradually becoming more likely.

As an example DR, there is an incentive type DR that discounts the electric utility fee under a predetermined condition. The incentive in this case is the discount of fee applied in response to the electricity quantity suppressed by the consumer in order to motivate, induce or prompt the consumer to suppress electricity.

According to the incentive type DR, a base line is set which is the threshold of the electricity usage to determine the presence/absence of the incentive based on the past electricity usage of the consumer within a certain time period. Next, the incentive is applied only when the electricity usage by the consumer becomes lower than the base line.

When, however, an operating schedule to minimize the costs is planned in consideration of the incentive type DR through the above-explained technologies, there are following matters to strictly formulate and to optimize the consumed energy and the costs which corresponds to the incentive.

That is, an objective function to obtain the optimized value to minimize the costs becomes a complex formula. This is because terms with discontinuous variables indicating the presence/absence of the incentive are added to the objective function based on a relationship between the electricity usage of the whole architecture calculated on the basis of the operating schedule, etc., of multiple devices and the electricity usage relative to the base line. In addition, to obtain the optimized value, it is necessary to apply an optimization scheme that permits discontinuous variables.

When, for example, the incentive is calculated from the consumed electricity quantity based on the set operating schedule, and an optimization including this incentive is attempted, the operating schedule is also changed. In addition, the presence/absence of the incentive changes based on whether it is over or below the base line. When formulae in consideration of those factors are bundled as a formula, it becomes quite complex.

The embodiments of the present disclosure have been made in order to address the disadvantages of the conventional technologies, and it is an objective of the present disclosure to provide an electricity suppressing type electricity and heat storage optimizing technology that can obtain an optimized operating schedule in response to an incentive type demand response while avoiding the complexity of formulation and optimization.

Solution to Problem

To accomplish the above objective, an embodiment of the present disclosure employs the following features.

(1) An energy predictor that sets, for at least one of control-target devices which are an energy supplying device supplying energy, an energy consuming device consuming energy, and an energy storing device storing energy, a predicted value of consumed energy of the energy consuming device or of supplied energy of the energy supplying device within a predetermined future time period.

(2) A schedule optimizer that optimizes an operating schedule of the control-target device within the predetermined time period in accordance with a predetermined evaluation barometer and based on the predicted value, a characteristic of the control-target device, and a unit price of an energy usage fee.

(3) An incentive acceptance determiner which determines a time with a possibility that an incentive is receivable based on the predicted value, an electricity suppression target time that is a time prepared for applying an incentive to electricity suppression, and a base line that is a threshold for whether or not to apply the incentive.

(4) An electricity suppressing schedule optimizer that optimizes the operating schedule of the control-target device within the predetermined time period in accordance with the predetermined evaluation barometer and based on the predicted value, the characteristic of the control-target device, and a unit price of the energy usage fee having a unit price for calculating the incentive taken into consideration.

(5) An adopted schedule selector that selects either the operating schedule optimized by the schedule optimizer and the operating schedule optimized by the electricity suppressing schedule optimizer based on the predetermined evaluation barometer or a selection instruction input externally.

A method and a program run by a computer to realize the respective functions of the above-explained components using a computer or an electric circuit are also other aspects of the present disclosure.

BRIEF DESCRIPTION OF DRAWINGS

FIG. 8 is a diagram illustrating an example optimizing variable for a state optimization;

DESCRIPTION OF EMBODIMENTS

A. First Embodiment

1. Brief Summary of Electricity and Heat Storage Optimizing System

Figure 1:
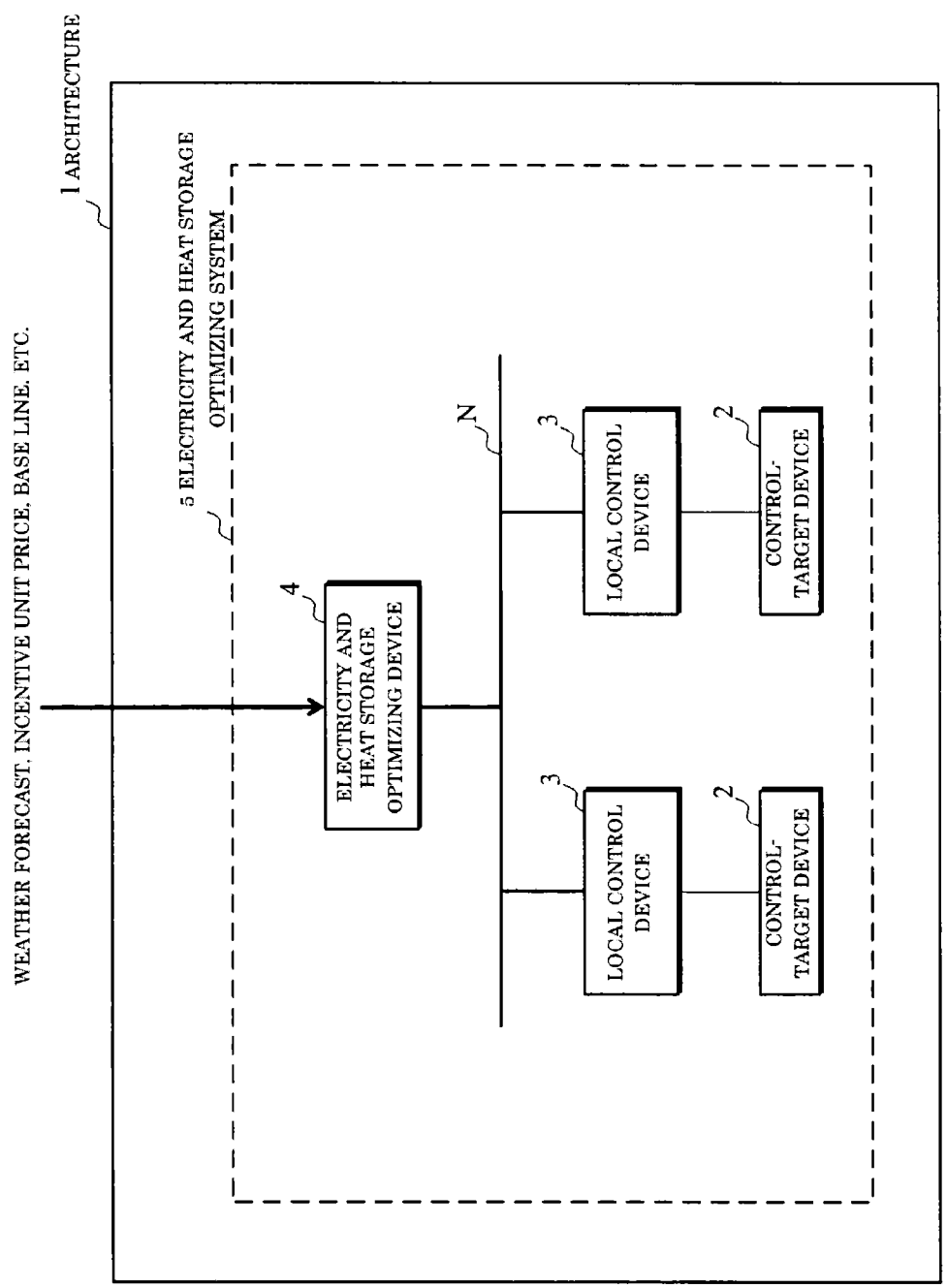
FIG. 1 is a connection configuration diagram illustrating an example electricity and heat storage optimizing system.

As illustrated in FIG. 1, an electricity and heat storage optimizing system 5 according to this embodiment includes various control-target devices 2, local control devices 3 and an electricity and heat optimizing control device 4 all placed in a target architecture 1.

The control-target devices 2 include at least one of an energy consuming device, an energy supplying device, and an energy storing device. The energy consuming device is a device that consumes supplied energy. For example, the energy consuming device includes an air conditioning device (air conditioner), a lighting device, and a heat source device.

The energy supplying device is a device that supplies energy to the energy consuming device and the energy storing device. For example, the energy supplying device includes a solar power generator (PV), and a solar water heater.

The energy storing device is a device that stores supplied energy. For example, the energy storing device includes a battery and a heat storage tank. The control-target device 2 of this embodiment includes a device that functions as anyone of energy consuming device, energy supplying device and energy storing device.

The term "electricity and heat storage" means to utilize the energy storing capability of the energy storing device to optimize an operating schedule, and it is appropriate if at least one of electricity storage and heat storage is utilized.

The local control device 3 is a device that is connected to each control-target device 2 and controls the operation of each control-target device 2. For example, the local control device 3 controls activation, deactivation, and output, etc., of each control-target device 2. In the following explanation, activation and deactivation are collectively referred to as activation/deactivation in some cases.

The local control device 3 may be provided for each control-target device 2 or may be configured to collectively control the multiple control-target devices 2. The control by each local control device 3 is performed in accordance with control information from the electricity and heat optimizing control device 4 connected to each local control device 3 through a network N.

The electricity and heat optimizing control device 4 is a device that optimizes the operating schedule of the control-target device 2 based on pieces of information, such as the unit price of energy usage fee, process data, an electricity suppression target time, a base line, and an incentive unit price.

The unit price of energy usage fee is the unit price of a fee made in accordance with the consumption quantity of energy subjected to a purchase among the consumed energies. The incentive unit price is a unit price to calculate the amount of incentive by multiplying the reduced consumption quantity among the energy consumption quantities subjected to an energy usage fee by such a unit price. For example, such a unit price can be expressed in a unit of JP YEN/kW, JP YEN/kWh, etc.

The energy subjected to an energy usage fee is energy requiring a payment of a compensation with respect to a usage, and includes, for example, electricity, and gas. Water is also included in the energy in this example. Hence, the energy usage fee includes an electric utility fee, a gas fee, and a water fee. In addition, the energy usage fee subjected to the incentive is, in general, the electric utility fee, and a process is performed based on the electric utility fee in this embodiment. When, however, the usage fee of other energy is subjected to the incentive, the process including such a target is included.

The operating schedule is a schedule for an operation of each control-target device in a predetermined future time period for each time slot. For example, the operating schedule contains information on activation/deactivation such that from what time and until what time the control-target device is operated, and when there are multiple control-target devices, contains information regarding how many of such devices are operated from what time and until what time.

In addition, the operating schedule contains information for setting the level of the output by the control-target device. For example, the operating schedule includes a control set value represented by a value expressed by a quantitative numerical value like some kW and some kWh. The control set value is a parameter to set the operating state of each control-target device 2.

For example, the control set value includes a temperature set value and a PMV set value of an air conditioner that is an energy consuming device, and an illumination intensity set value of illumination. The term PMV is an abbreviation of Predicted Mean Vote, and is defined by the thermal index ISO7730 for air conditioners. The PMV quantifies how a person feels cold, and 0, −, and + indicate comfortable, cold, and warm, respectively. The parameters to calculate the PMV are temperature, humidity, average radiative temperature, amount of clothing, amount of activity, and wind speed, etc.

The process data includes information from the exterior which changes as time advances. For example, the process data includes weather data, and operation data. The weather data includes past weather data, and weather forecast data. The operation data includes the past control set value of each control-target device 2, and the state quantity of each control-target device 2 when the operating schedule was carried out.

The state quantity of each control-target device 2 when the operating schedule was carried out includes the consumed energy of each control-target device 2 and generated energy thereof. For example, the state quantity includes an output by a CGS, an electric freezer, and an absorption water cooler/heater that are energy supplying devices, and a load rate thereof. In addition, the state quantity includes a discharging rate of a battery that is an energy storing device, a heat storing rate thereof, a heat dissipation rate of a heat storing device and a heat storing rate thereof.

The electricity suppression target time is a time prepared with an application of an incentive when a suppression by electricity usage reduction becomes successful. For example, a time between 13:00 and 16:00 is included in the electricity suppression target time as a time for applying the incentive.

The base line is a threshold of the electricity usage that is a reference as to whether or not the incentive is applied. The base line can be set based on a past electricity usage by a consumer within a certain time period.

For example, the base line is calculated based on an actual value of electricity demand in an architecture, etc., within past several days or several weeks. The base line in this embodiment is set for each day, and as an example case, the constant base line is maintained all day long.

2. Connection Configuration of Control-Target Device

Figure 2:
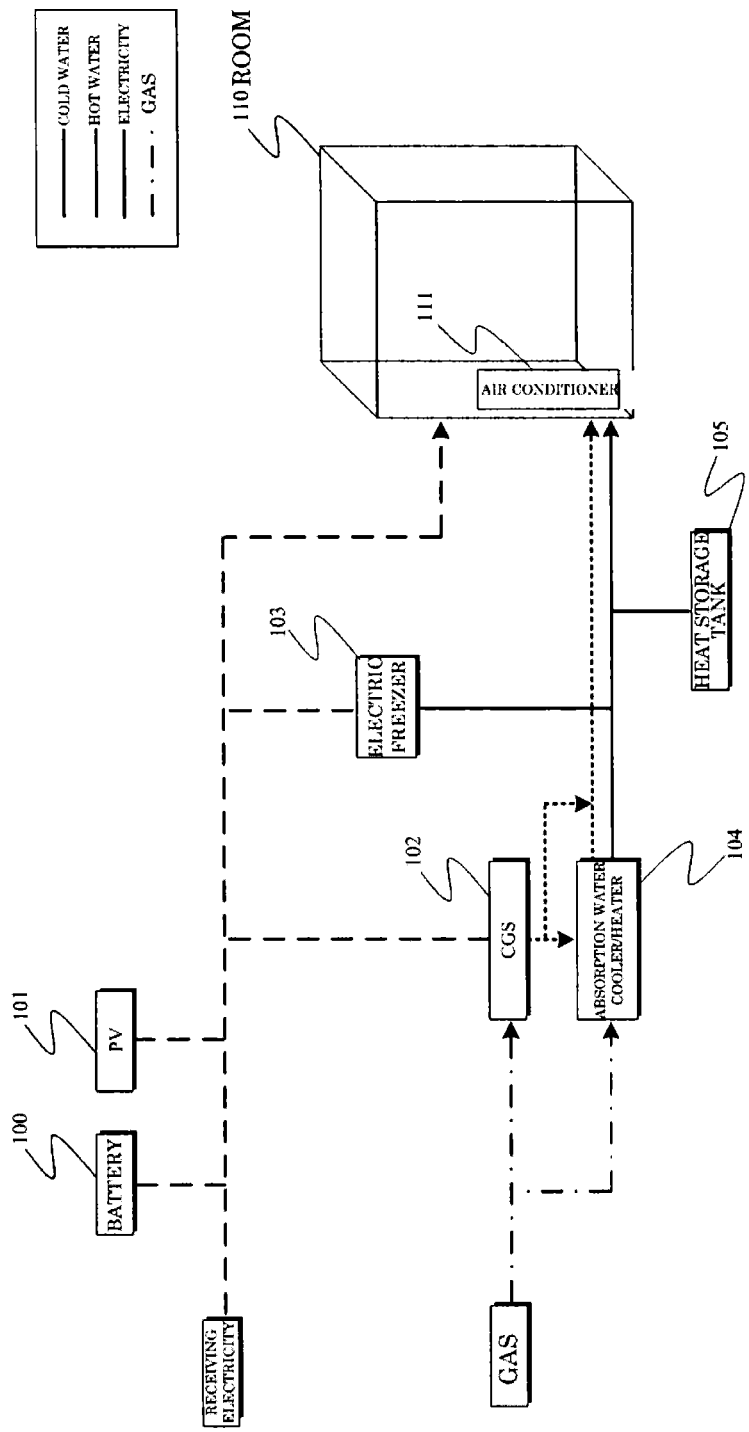
FIG. 2 is a connection configuration diagram illustrating an example configuration of a control-target device in an architecture.

FIG. 2 illustrates an example connection configuration of the various control-target devices 2 and example flows of energies, such as cold water, hot water, electricity, and gas. The exchange relationship of the energy among those control-target devices 2 is to supply electricity, cold heat, and hot heat to an air conditioner 111 or the like of a room 110 by using electricity received from the exterior and gas supplied from the exterior as energy sources.

As the control-target devices 2, a battery 100, a PV 101, a CGS 102, an electric freezer 103, an absorption water cooler/heater 104, and a heat storage tank 105 are installed. Those control-target devices 2 are merely examples, and it is optional whether any one of those control devices 2 is utilized or not utilized. In addition, this embodiment does not exclude the control-target device 2 not exemplified.

For example, other control-target devices, such as an air-cooled HP (heat pump), a water-cooled freezer, a solar water heater, can be installed. That is, the control target according to this embodiment is not limited to the above-explained device configuration, and this embodiment is applicable to a case in which some devices are omitted and a case in which this embodiment is easily applicable if the scheme thereof is extended.

The battery 100 is a facility that utilizes a secondary battery capable of performing both charging and discharging. The PV 101 is a power generation facility including solar panels that convert solar energy into electrical energy. The PV 101 is one of devices that change the supply quantity of electrical energy depending on the meteorological phenomenon condition like weather.

The CGS (Co-Generation System) 102 is a system that can generate electricity with an internal combustion engine or an external combustion engine, and can utilize the exhaust heat thereof. An example CGS 102 is a co-generation system that generates electricity using gas as an energy source, and utilizes the exhaust heat thereof. A fuel cell may be utilized as a generation and heat source.

The electric freezer 103 is a compression freezer that performs cooling through the processes of compression of gas coolant, condensation, and vaporization, and utilizes an electric compressor to compress the coolant.

The absorption water cooler/heater 104 is an apparatus that supplies cold water or hot water with processes of absorption of water vapor and regeneration by a heat source between a condenser of a coolant and a vaporizer thereof.

Example energies available for the heat source are gas and exhaust heat from the CGS 102, etc.

The heat storage tank 105 is a tank to store heat through a reserved heat medium. The above-explained electric freezer 103, the absorption water cooler/heater 104, and the heat storage tank 105 are capable of supplying hot water or cold water for the air conditioner 111 installed in the room 110.

Setting parameters include, for example, various parameters for the processes of this embodiment, such as a process timing, a weight coefficient, an evaluation barometer, a device characteristic, and a preference order. The process timing includes a timing at which an optimizing processor 40 to be discussed later starts a process, and a timing at which a rescheduling necessity determiner 17 determines the necessity of rescheduling.

The weight coefficient is a coefficient utilized for a similarity calculation to be discussed later. The evaluation barometer is a barometer to be minimized for optimization such as consumed energy, supplied energy, costs, and the like. The device characteristic includes various parameters defined by the characteristic of each device, such as the rating of each control-target device 2, the lower limit output, a COP, and the like. Those parameters include a parameter utilized for various calculations to be discussed later.

The COP is a coefficient of performance of a heat source device like a heat pump, and is obtained by dividing the cooling or heating performance by consumed electricity. The preference order is a preference order of determination times at which an acceptance of an incentive to be discussed later is determined.

3. Configuration of Electricity and Heat Optimizing Control Device

Figure 3:
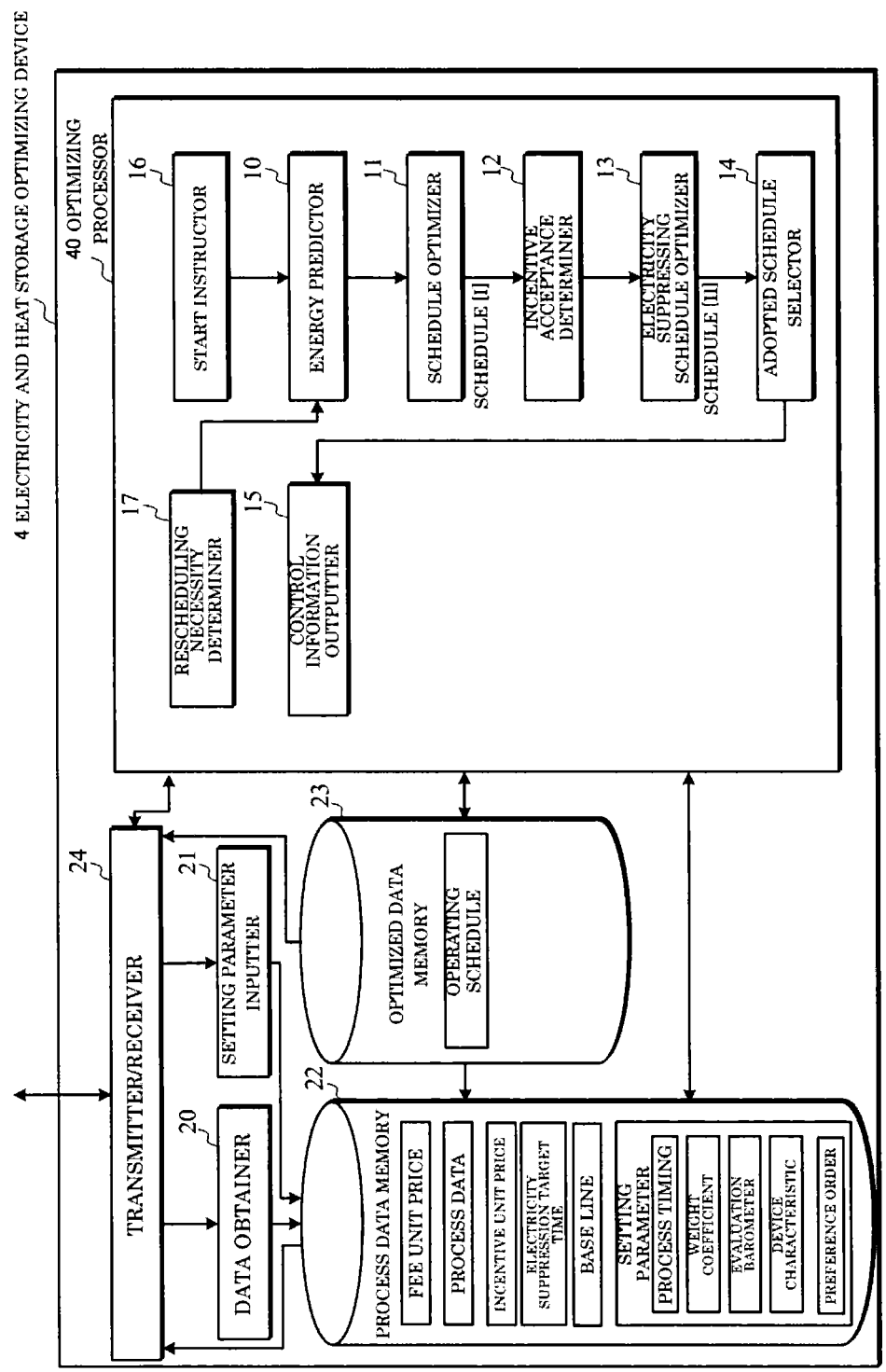
FIG. 3 is a block diagram illustrating an example configuration of an electricity and heat optimizing control device according to a first embodiment.
Figure 4:
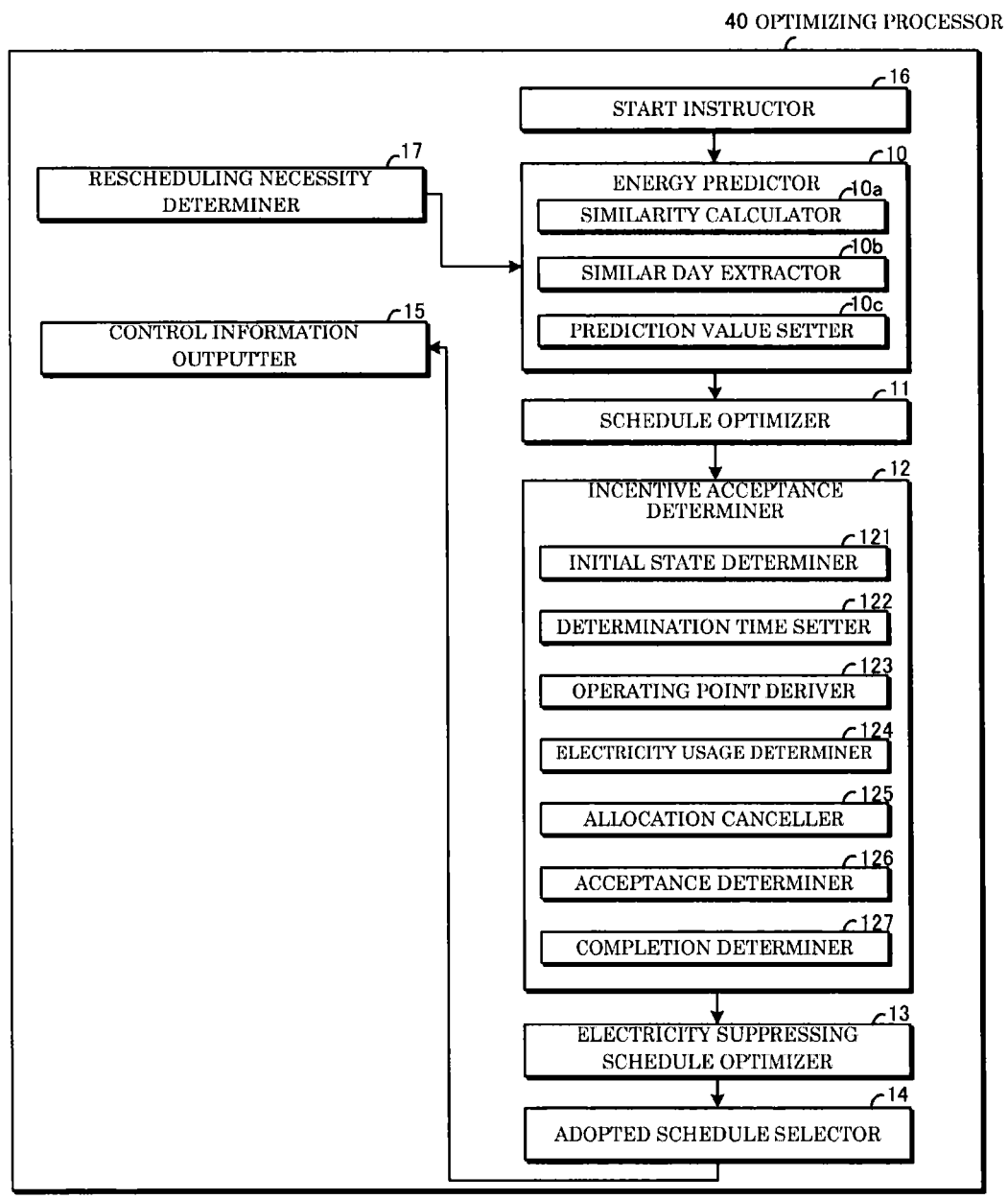
FIG. 4 is a block diagram illustrating a configuration of an optimizing processor.

A configuration of the electricity and heat optimizing control device 4 will be explained with reference to FIGS. 3 and 4. FIG. 3 is a block diagram illustrating an entire configuration of the electricity and heat optimizing control device 4, and FIG. 4 is a block diagram illustrating an optimizing processor 40.

The electricity and heat optimizing control device 4 includes the optimizing processor 40, a data obtainer 20, a setting parameter inputter 21, a process data memory 22, an optimized data memory 23, and transmitter/receiver 24.

[3-1. Optimizing Processor]

The optimizing processor 40 includes an energy predictor 10, a schedule optimizer 11, an incentive acceptance determiner 12, an electricity suppressing schedule optimizer 13, an adopted schedule selector 14, a control information outputter 15, a start instructor 16, and the rescheduling necessity determiner 17.

(1) Energy Predictor

The energy predictor 10 is a processing unit that predicts the consumed energy or generated energy of the control-target device 2. The prediction scheme is not limited to any particular one. The energy predictor 10 of this embodiment includes, for example, as illustrated in FIG. 4, a similarity calculator 10a, a similar day extractor 10b, and a prediction value setter 10c.

The similarity calculator 10a is a processing unit that calculates a similarity between a day when an operating schedule to be optimized is executed and a past day based on the past day of the week, weather, temperature, and humidity, stored in the process data memory 22 on the basis of a predetermined similarity calculating formula. The similar day extractor 10b is a processing unit that extracts a similar day to the day when the operating schedule is executed based on the similarity calculated by the similarity calculator 10a.

The prediction value setter 10c is a processing unit that sets, as an energy predicted value, the consumed energy or generated energy of the control-target device 2 at the date and hour of the similar day extracted by the similar day extractor 10b based on operation data on that similar day.

(2) Schedule Optimizer

The schedule optimizer 11 is a processing unit that optimizes the operating schedule so as to minimize the evaluation barometer of the control-target device 2. An example evaluation barometer of this embodiment is costs necessary for the energy when the control-target device 2 is actuated. This optimization is performed by, for example, optimizing the variable of a constraint condition formula so as to minimize the object function based on the predicted energy value by the energy predictor 10.

(3) Incentive Acceptance Determiner

The incentive acceptance determiner 12 is a processing unit that determines a time at which the incentive is receivable through a reduction of electricity usage. The time at which the incentive is receivable is, among the electricity suppression target time, a time at which the consumer can receive the incentive under the optimized operating schedule.

This incentive acceptance determiner 12 includes an initial state determiner 121, a determination time setter 122, an operating point deliverer 123, an electricity usage determiner 124, an allocation canceller 125, an acceptance determiner 126, and a completion determiner 127.

(a) Initial State Determiner

The initial state determiner 121 is a processing unit that determines the initial state of the SOC (State Of Charge) of the battery 100 and the remaining heat storage of the heat storage tank. The SOC is a unit indicating the charged condition of the battery 100. It relatively represents the ratio of remaining charge to a full charge.

(b) Determination Time Setter

The determination time setter 122 is a processing unit that determines a time for determining as to whether or not the incentive is receivable in accordance with a preset preference order. Setting of such a preference order enables a creation of electricity reduction patterns in accordance with various demands. According to this embodiment, for example, the determination time is set in a descending order of the value of the predicted electricity consumption energy predicted by the energy predictor 10.

(c) Operating Point Deliverer

The operating point deliverer 123 is a processing unit that sets the operating point of the device to minimize the electricity usage at the determination time.

(d) Electricity Usage Determiner

The electricity usage determiner 124 is a processor to determine whether the electricity usage at the derived operating point exceeds a predetermined reference or is equal to or lower than the predetermined reference. An example predetermined reference is the base line.

(e) Allocation Canceller

The allocation canceller 125 is a processing unit that cancels the allocation of the heat dissipation quantity from the heat storage tank 105 and the discharging quantity from the battery 100 in accordance with the determination result by the electricity usage determiner 124. The cancelling means that heat dissipation and discharging which corresponds to the allocated quantity are not performed. The cancelled heat dissipation quantity and discharging quantity may be utilized for determining a determination time in the next order.

(f) Acceptance Determiner

The acceptance determiner 126 is a processing unit that determines as to whether or not the incentive is receivable in accordance with the determination result by the electricity usage determiner 124.

(g) Completion Determiner

The completion determiner 127 determines whether or not the determination on the receipt of the incentive completes for all DR target times.

(4) Electricity Suppressing Schedule Optimizer

The electricity suppressing schedule optimizer 13 is a processing unit that optimizes the operating schedule so as to minimize the evaluation barometer of the control-target device 2 in consideration of the incentive. For example, the evaluation barometer is the same as that of the schedule optimizer 11.

For such an optimization, for example, the above-explained object function and constraint condition formula are applicable. However, the electricity suppressing schedule optimizer 13 adds the incentive unit price to the unit price of the electric utility fee at a time at which it is determined that the incentive is receivable, and sets the upper limit of the electricity usage through the optimization as the base line.

(5) Adopted Schedule Selector

The adopted schedule selector 14 is a processing unit that sets an operating schedule to be actually applied among respective operating schedules obtained by the schedule optimizer 11 and the electricity suppressing schedule optimizer 13. When, for example, the costs is set as the evaluation barometer as explained above, the net electric utility fee and gas fee of a day are calculated, and an operating schedule with a smaller one is adopted.

(6) Control Information Outputter

The control information outputter 15 is a processing unit that outputs the control information of the control-target device 2 to the local control device 3 based on the adopted operating schedule. The control information is information to operate the control-target device 2 in accordance with the operating schedule, and, for example, includes information, such as activation/deactivation for each time slot, and the control set value.

(7) Start Instructor

The start instructor 16 is a processing unit that starts the execution of an optimizing process by the optimizing processor 40 at a preset timing. When, for example, an electricity and heat storing schedule is set a day before the execution day, a predetermined time for each day can be set as a setting timing. At what daily interval and at which time the setting timing is set is optional.

(8) Rescheduling Necessity Determiner

The rescheduling necessity determiner 17 is a processing unit that determines whether or not it is necessary to optimize the operating schedule again at a preset timing.

[3-2. Data Obtainer]

The data obtainer 20 is a processing unit that obtains data necessary for the process by the optimizing processor 40 from the exterior. Example data obtained are process data, an incentive unit price, an electricity suppression target time, and the base line.

[3-3. Setting Parameter Inputter]

The setting parameter inputter 21 is a processing unit that inputs a setting parameter necessary for the process by the optimizing processor 40. The setting parameter includes, as explained above, a process timing, a weight coefficient, an evaluation barometer, a device characteristic, and a preference order.

[3-4. Process Data Memory]

The process data memory 22 is a processing unit that stores data necessary for the process by the optimizing processor 40. This data includes the unit price of energy usage fee, process data, the incentive unit price, the electricity suppression target time, the base line, and the setting parameter.

This process data memory 22 stores, in addition to the above-exemplified data, necessary information for the process by each processor. For example, such information includes a calculation formula for each processor, and a parameter thereof. Hence, the unit prices, etc., of the electric utility fee and the gas fee to calculate a fee are stored in the process data memory 22.

[3-5. Optimized Data Memory]

The optimized data memory 23 is a processing unit that stores data obtained through the optimizing process by the optimizing processor 40. For example, the optimized data memory 23 stores operating schedules optimized by the schedule optimizer 11 and the electricity suppressing schedule optimizer 13.

The data stored in the optimized data memory 23 may be stored in the process data memory 22 as past operation data, and may be utilized for the above-explained respective calculation processes by the optimizing processor 40.

[3-6. Transmitter/Receiver]

The transmitter/receiver 24 is a processing unit that exchanges, via the network N, information among the electricity and heat optimizing control device 4, the local control device 3, the terminal of an architecture manager, a host monitoring control device, and a server that provides meteorological phenomenon information, etc. When the transmitter/receiver 24 transmits data stored in the process data memory 22 and the optimized data memory 23, the above-explained external device becomes available.

The electricity and heat optimizing control device 4 includes an inputter that inputs necessary information for the process by each processor, selects a process, and inputs an instruction, an interface to input information, and an outputter that outputs a process result, etc.

The inputter includes input devices available currently or in future, such as a keyboard, a mouse, a touch panel, and a switch. The inputter can accomplish the functions of the above-explained data obtainer 20 and setting parameter inputter 21.

The outputter includes all output devices available currently or in future, such as a display device, and a printer. The outputter displays, etc., the data stored in the process data memory 22 and the optimized data memory 23, thereby allowing the operator to view the data.

4. Operation of Electricity and Heat Optimizing Control Device

An operation of the electricity and heat optimizing control device 4 according to this embodiment explained above will be explained with reference to FIGS. 2, 5 to 11.

[4-1. Flow of Energy]

First, an explanation will be given of the flow of electricity, gas, cold water, and hot water in the control-target device 2 with reference to FIG. 2. That is, electric power received from an electric power system is stored in the battery 100 or is supplied to the above-explained energy consuming device.

The electric power generated by the PV 101 and the CGS 102 is also stored in the battery 100 or is supplied to the above-explained energy consuming device. The electricity supplied to the energy consuming device is consumed by the electric freezer 103 to generate heat.

Conversely, the gas from a gas supplying system is supplied to the CGS 102 and the absorption water cooler/heater 104. The absorption water cooler/heater 104 can generate cold heat using hot heat generated by the CGS 102. In addition, the absorption water cooler/heater 104 can increase the generating amount of cold heat through the introduction of gas. The absorption water cooler/heater 104 can supply hot heat only through the introduction of gas.

The cold heat generated by the electric freezer 103 and the absorption water cooler/heater 104 is stored in the heat storage tank 105 or is supplied to the air conditioner 111 installed in the room 110. The air conditioner 111 controls the temperature of the room 110 using the supplied cold heat. In addition, the air conditioner 111 can perform heating upon accepting the supply of hot water generated at either one of the CGS 102 and the absorption water cooler/heater 104.

[4-2. Relationship Between Electricity Usage and Base Line]

Figure 5:
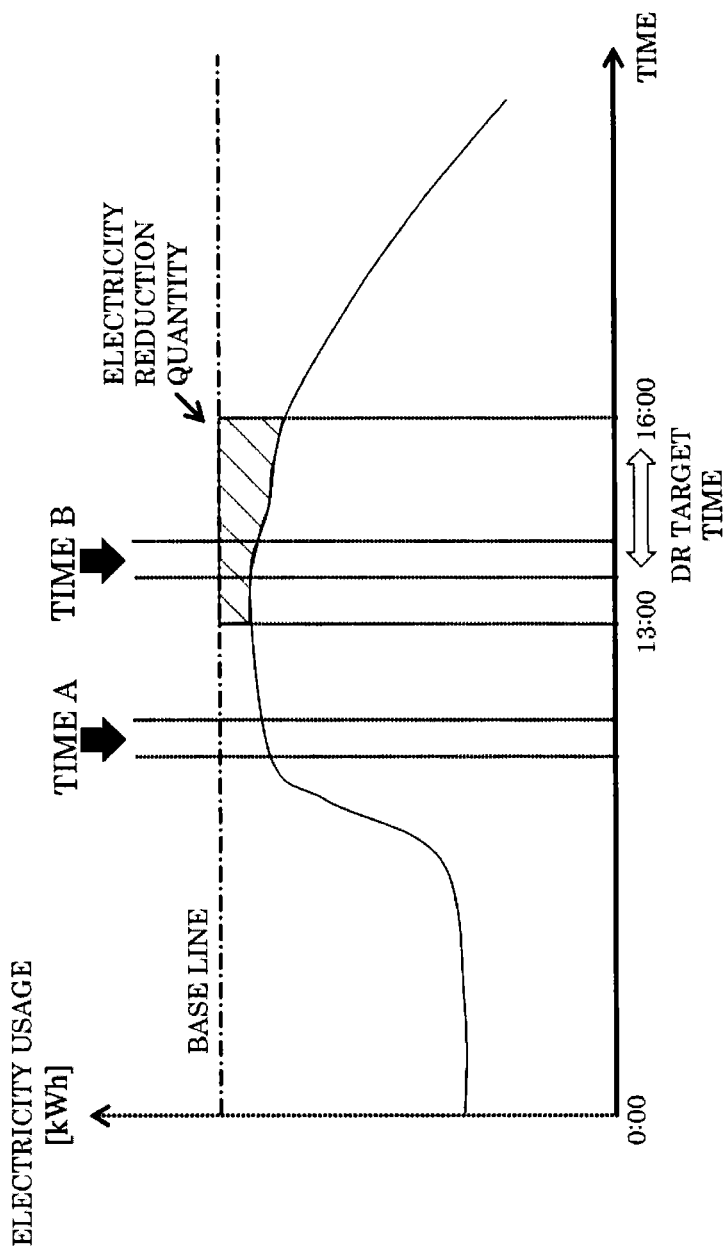
FIG. 5 is a diagram illustrating an example relationship between an electricity usage and a base line.

An explanation will now be given of a relationship among the electricity usage, the base line, the electricity suppression target time, and the electricity reduction quantity in an architecture to which an incentive type DR is applied with reference to FIG. 5. FIG. 5 illustrates a transition of the electricity usage of a day in an architecture. The horizontal line represents a time in a day, and the vertical line represents the electricity usage of the architecture.

As explained above, the base line is set based on the actual accomplishment value of the past electricity demand (consumed electricity) in a target architecture or factory, etc. For example, the maximum electricity usage at an electricity suppression target time within several days, several weeks, or a month can be set as the base line. How to set the base line is not limited to this example.

As is exemplified by a hatching portion in FIG. 5, in the electricity suppression target time in the DR (in this example, from 13:00 to 16:00), the quantity of electricity usage lower than the set base line is determined as the electricity reduction quantity.

In FIG. 5, a time A is not an electricity suppression target time, and thus no incentive is receivable even though the electricity usage is lower than the base line. A time B is an electricity suppression target time, and thus the incentive is receivable in accordance with the quantity lower than the base line.

However, it is expected that the following PTR, L-PTR and CCP are applied as the example contract systems including an incentive.

(1) PTR: Peak Time Rebate

The PTR is a contract system in which a money amount obtained by multiplying the above-explained electricity reduction quantity by the incentive unit price is paid to a consumer.

(2) L-PTR: Limited Peak Time Rebate

The L-PTR is similar to the PTR, but is a contract system having an upper limit for the incentive to be paid.

(3) CCP: Capacity Commitment Program

This is a contract system in which the fixed money amount in accordance with the base line and a target value is paid only when the electricity reduction quantity exceeds the target value thereof set in advance throughout all times in the DR target time.

That is, it is not always true that the money amount simply proportional to the electricity reduction quantity is the incentive, and a limitation to some kind is set in some cases. Those are merely examples, and in general, it is not true that only such schemes are established or expected to be carried out. With respect to actual practice, various different schemes are applicable.

[4-3. Cost Transition Due to Electricity Suppression]

Figure 6:
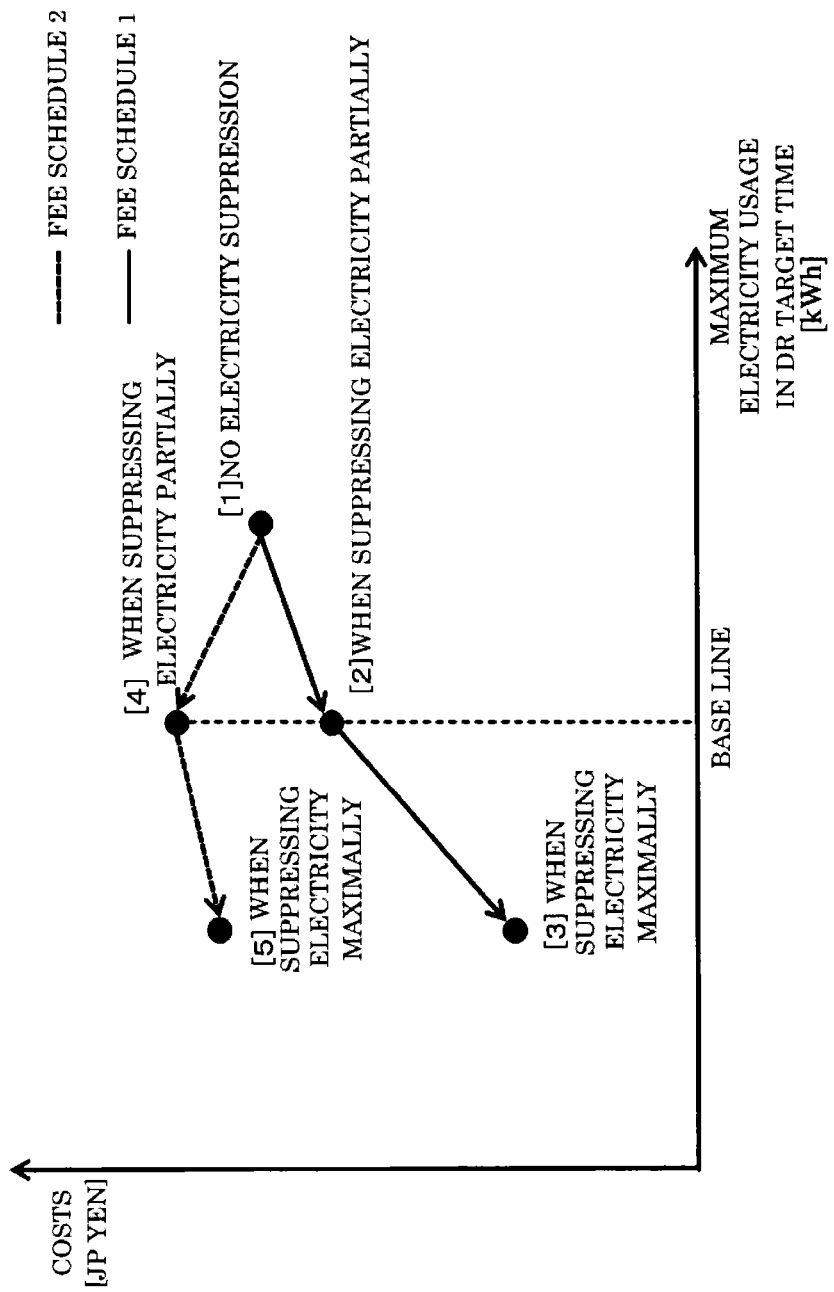
FIG. 6 is a diagram illustrating an example transition in costs through electricity suppression.

A concept of a cost transition due to electricity suppression will be explained with reference to FIG. 6. FIG. 6 is a graph representing a transition of costs when the electricity usage in the DR target time is gradually suppressed. The vertical axis represents the costs of electricity and gas, while the horizontal axis represents the maximum electricity usage in the DR target time. The respective meanings of black dots [1] to [5] in the figure and the explanation for the transition are as follows.

First of all, the black dot [1] indicates a case in which no electricity suppression action is performed at all. With reference to this black dot [1] being as an origin, a consideration will be given of a case in which an electricity suppression is performed through a load shift utilizing a heat storage or an electricity storage based on two kinds of fee schedules 1 and 2.

In this case, the fee schedule 1 is a case in which the electricity unit price in the DR target time is higher than those in other times. The fee schedule 2 is a case in which the electricity unit price in the DR target time is substantially same as or cheaper than those of other times.

In the case of, for example, the fee schedule 1, both costs and maximum electricity usage decrease through a load shift. The load shift is to shift the time slot at which purchased electricity is utilized. An example load shift is a case in which the battery 100 is charged during a midnight at which the unit price of fee is inexpensive, and the electricity is obtained from the battery 100 during a daytime at which the unit price of fee is expensive, thereby reducing the quantity of purchased electricity to reduce the costs.

According to such a scheme, a time point at which the electricity is partially suppressed up to the base line is indicated by a black dot [2]. When more electricity is charged in the battery 100 and the consumed electricity quantity in the daytime can be further suppressed, the costs can be further reduced. That is, when the electricity suppression is continued until the maximum electricity usage becomes lower than the base line, the reduction level of the costs becomes large to which the incentive is added. A time point at which the electricity is maximally suppressed accordingly is indicated by a black dot [3].

Conversely, in the case of the fee schedule 2, the electricity unit price in the DR target time is substantially same as or cheaper than those in other times, and thus there is a possibility that the costs increase through a load shift. That is, even if the charging time is set as a midnight, the electric utility fee in the midnight is the same as that in the daytime or is higher. Hence, when the electricity loss is taken into consideration, the costs increase on the contrary. A time point at which the electricity is partially suppressed up to the base line in this manner is indicated by a black dot [4].

Still further, when the maximum electricity usage is lower than the base line and the electricity suppression is continued, the cost increase level to which the incentive is added becomes small. Alternatively, there is a possibility that the costs conversely decrease. A time point at which the costs become decreasing and the electricity is suppressed maximally is indicated by a black dot [5].

However, in the case of the fee schedule 2, as is indicated by [1] and [5] in FIG. 6, even if the electricity is suppressed maximally, there is a possibility that the costs increase in comparison with a case in which no electricity is suppressed. Hence, in the case of the fee schedule 2, a case in which no electricity suppression action is performed at all resultantly is an example case in which the costs become minimum. The trajectory difference between [1], [2], [3] and [1], [4], [5] is caused due to, for example, a difference in the unit price of electric utility fee, or may be caused by a difference in other parameters.

As explained above, even if the electricity unit price in the DR target time is virtually changed and optimized, there may be a case in which the effects of the cost increase associated with the electricity suppression up to the base line are not taken into consideration. In this case, a false operating schedule may be derived which attempts to suppress the electricity although the costs increase.

Still further, if there is a time slot at which the electricity usage exceeds the base line, no incentive is receivable in practice within that time slot. Hence, the obtained operating schedule is not a proper schedule.

According to this embodiment, upon newly focusing attention on the above-explained circumstances, a case in which the incentive is taken into consideration and a case in which no incentive is taken into consideration are compared, and either one case is selected. For example, in the above-explained example, operating schedules for [3] and [5] are planned and compared eventually, and thus an optimized schedule is obtainable.

In addition, according to this embodiment, in order to simplify the calculation, for example, an optimizing scheme that has a virtual electricity unit price expected to which the incentive is added for a time slot at which the incentive is given is employed. That is, during the calculation that has the incentive taken into consideration, it is not strictly evaluated as for how much the electricity usage is reduced with respect to the incentive, but only the unit price is replaced with a higher one to simplify the calculation.

[4-4. Process of Optimizing Next-Day Operating Schedule One Day Before]

The process procedure of the electricity and heat optimizing control device 4 will be explained with reference to the flowcharts of FIGS. 7 and 9. The process explained below is an example case in which the next-day operating schedule of the control-target device 2 in the architecture 1 is optimized in the night one day before. It is appropriate if the operating schedule to be optimized is a future predetermined time period, and is not limited to the next day or a day after the next day.

[Optimization Execution Starting Process]

First, the start instructor 16 instructs an execution of the optimizing process to the energy predictor 10 at a preset time. When, for example, it becomes 21:00 of one day before, the optimizing processor 40 starts executing the optimizing process. The flowchart of FIG. 7 illustrates a process flow after the execution of the optimizing process is started upon instruction from the start instructor 16.

[Energy Predicting Process]

The energy predictor 10 predicts (step 01) the consumed energy or supplied energy of the control-target device 2 based on the meteorological phenomenon data and operation data in past predetermined time period stored in the process data memory 22.

An explanation will be given of an example predicting process by the energy predictor 10. First, the similarity calculator 10$a$ calculates the similarity based on the past day of week, weather, a temperature, and a humidity stored in the process data memory 22 as the meteorological phenomenon data and the operation data. An example calculation formula of the similarity is represented by the following formula (1).

$$\text{Similarity} = |\text{weight by day of week}| + |\text{weight by weather}| + a \times |\text{next day maximum temperature} - TM_i| + b \times |\text{next day minimum temperature} - TL_i| + c \times |\text{next day relative humidity} - RH_i| \to \min(i=1, 2, 3, \ldots n-1, n) \quad (1)$$

In this case, the "weight by day of week" utilized is a weight coefficient for each day of week set in advance. a, b, and c are weight coefficients of respective factors. Likewise, the "weight of weather" utilized is a weight coefficient for each weather set in advance.

When, for example, the next day is "Tuesday", the "weight by day of week" is the weight of "Tuesday". When the weather based on the weather forecast for the next day is "sunny", the "weight of weather" is the weight for "sunny". The maximum temperature of the next day, the minimum temperature thereof, and the relative humidity thereof applied are predicted data.

Next, as the past meteorological phenomenon data, a maximum temperature $TM_i$, a minimum temperature $TL_i$, and a relative humidity $RH_i$ of each day recorded in association with the day number of the past day are utilized. The day number is a serial number allocated upon sorting the operation data stored in the process data memory 22 and the corresponding meteorological phenomenon data day by day.

The setting of each weight is optional. When, for example, the weather based on the next day forecast is "sunny", if the past data is "sunny", the weight coefficient becomes small, but if the past data is "rain", the weight coefficient becomes large.

The "weight by day of week", the "weight by weather", and the weight coefficients of respective factors, such as a, b, and c, can be set optionally in accordance with the prediction precision based on data input from the setting parameter inputter 21 and stored in the process data memory 22.

As explained above, the similarity of the past day is obtained by a calculation through the formula (1). There are other similarity calculation schemes in practice, and thus this embodiment is not limited to this scheme.

Next, the similarity extractor 10$b$ extracts the day number at which the similarity obtained as explained above becomes minimum. The prediction value setter 10$c$ sets the consumed energy or the supplied energy of the control-target device 2 in the day corresponding to the extracted day number as prediction values of the next day.

[Schedule Optimizing Process]

Next, the schedule optimizing processor 11 optimizes (step 02) the operating schedule of the device based on the prediction values by the energy predictor 10. In this example, even if the barometer to be minimized is costs, no incentive through an electricity suppression is taken into consideration.

The object function to be minimized can be defined as the following formula (2), and the constraint condition formula can be defined as the following formulae (3) to (8). The constraint condition formulae (3) to (6) express the energy flow in FIGS. 3. (7) and (8) are constraint condition formulae of the capacity of the control-target device 2. Those definitional formulae are merely examples also.

$$\sum_{t=1}^{24} [X1^t \cdot E_C^t + GAS^t \cdot GAS_C] \Rightarrow \min \quad (2)$$

$$X1^t + E_{CGS} \cdot X6^t + E_{PV} + (X8^t - X8^{t+1}) = \frac{H_R}{COP_R} \cdot X5^t + E_{DEMAND}^t \quad (3)$$

$$GAS^t = GAS_{CGS} \cdot X6^t + GAS_{ABR-CG} \cdot X3^t + GAS_{ABR-HG} \cdot X4^t \quad (4)$$

$$H_{ABR-CH} \cdot X2^t + H_{ABR-CG} \cdot X3^t + H_R \cdot X5^t + (X7^t - X7^{t+1}) = HC_{DEMAND}^t \quad (5)$$

$$H_{CGS} \cdot X6^t + H_{ABR-HG} \cdot X4^t > H_{ABR-IN} \cdot X2^t + HH_{DEMAND}^t \quad (6)$$

$$|X7^t - X7^{t+1}| \le FL_{Hs} \quad (7)$$

$$|X8^t - X8^{t+1}| \le FL_{Bat} \quad (8)$$

where:
$E_c$: Electricity coefficient
$GAS_c$: Gas coefficient
$E_{CGS}$: CGS rated generation quantity
$E_{PV}$: Predicted PV generation quantity
$H_R$: Electric freezer rated cooling quantity
$H_{ABR-CH}$: Absorption water cooler/heater rated cooling quantity (producing cold water and loaded with exhaust heat)
$H_{ABR-CG}$: Absorption water cooler/heater rated cooling quantity (producing cold water and using gas)
$H_{ABR-HG}$: Absorption water cooler/heater rated heating quantity (producing hot water and using gas)
$H_{ABR-LV}$: Absorption water cooler/heater rated exhaust heat loading quantity
$COP_R$: Electric freezer COP
GAS: Gas usage
$GAS_{CGS}$: CGS rated gas usage
$GAS_{ABR-CG}$: Absorption water cooler/heater rated gas usage (when producing cold water)
$GAS_{ABR-HG}$: Absorption water cooler/heater rated gas usage (when producing hot water)
$E_{DEMAND}$: Predicted electricity consuming energy
$HC_{DEMAND}$: Predicted cold heat consuming energy
$HH_{DEMAND}$: Predicted hot heat consuming energy
$FL_{Hs}$: Maximum heat storage (release) quantity of heat storage tank
$FL_{Bat}$: Maximum charging (discharging) quantity of battery When variables X1 to X8 that minimize the formula (2) are obtained from the formulae (3) to (8), the optimization is enabled. FIG. 8 illustrates a summary of example variables X1 to X8 for optimization. X1 is an electricity usage, X2 to X6 are load factors of the control-target devices 2, X7 is a remaining heat storage quantity, and X8 is a remaining battery charge. Note that t that is a variable, etc., in formulae (2) to (8) represents a time (e.g., a unit is one hour).

The electricity coefficient in formula (2) and the gas coefficient therein vary depending on the barometer to be optimized. In the case of, for example, cost minimization, those become the unit price of electric utility fee and the unit price of gas fee, and in the case of $CO_2$ minimization, those become $CO_2$ emission quantities or coefficients corresponding thereto.

The formulae (3) to (8) are mainly constraint condition formulae, and a variable value that minimizes the optimization barometer while satisfying those conditions is derived through mathematical programming or repeated operations, etc., based on a simulation. The operating schedule obtained at this stage will be referred to as a schedule (I) below.

[Determination on Acceptability of Incentive]

The incentive acceptance determiner 12 selects (step 03) a time at which there is a possibility that the incentive is receivable among the DR target times upon reduction of the electricity usage. The operation of such an incentive acceptance determiner 12 will be explained with reference to the flowchart of FIG. 9.

(Determination on Initial State)

First, the initial state determiner 121 determines (step 11) the initial state of the SOC of the battery 100 and that of the remaining heat storage quantity of the heat storage tank 105. In this case, for example, cases in which the schedule is planned one day before are expected, and thus those are presumed as a full storing state.

(Determination on Determination Time)

Figure 10:
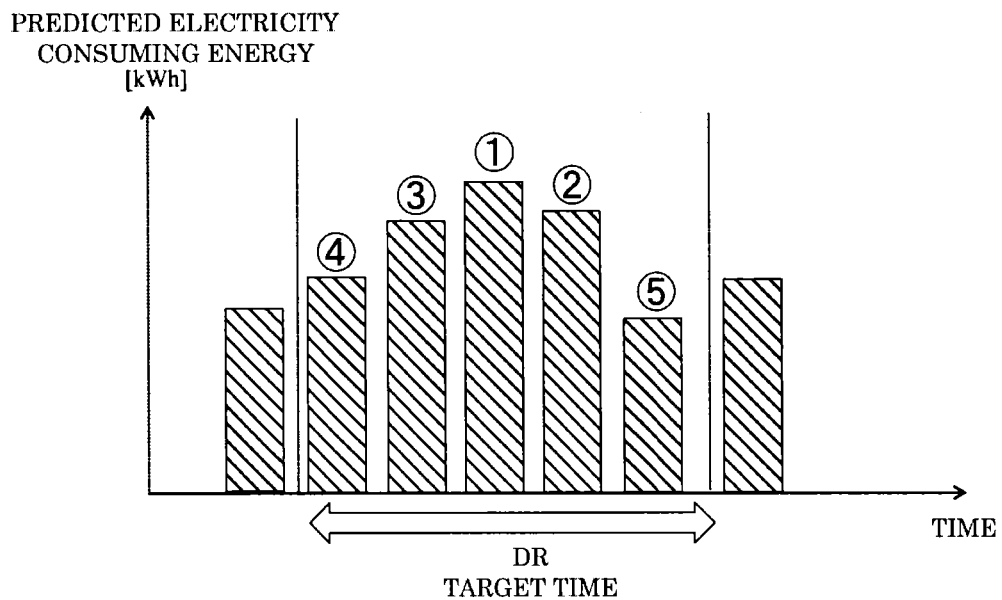
FIG. 10 is a diagram illustrating an example preference order of a determination time with respect to whether or not an incentive is receivable.

Next, the determination time setter 122 sets (step 12) a determination time. That is, as illustrated in FIG. 10, the determination time is set in the descending order of the value of predicted electricity consuming energies predicted by the energy predictor 10 in the DR target time. The smaller the number surrounded by a circle is, the higher the preference order is in the figure.

Determination of the determination time in the descending order of the value of predicted electricity consuming energy is to preferentially set a time with a higher electricity suppression demand as a suppression target. That is, a time at which the predicted electricity consuming energy is maximum is a time at which the demand is maximum.

Such a time often overlaps a time at which the electricity demand is a peak in view of a whole-society. Accordingly, when such a time is preferentially suppressed, it becomes possible to cope with the social demand. That is, in consideration of the whole society, it is desirable to reduce the peak at first, and thus a suppression is sequentially made from a time slot at which the demand is high to a time slot at which the demand is high at next.

(Derivation of Operating Point)

The operating point deriver 123 derives (step 13) the operating point of the device having the electricity usage minimized in the determination time. In this case, the electricity usage X1 can be calculated through the following formula (9) to which each term of the formula (3) is transitioned.

$$X1^t = \frac{H_R}{COP_R} \cdot X5^t + E_{DEMAND}^t - E_{CGS} \cdot X6^t - E_{PV} - (X8^t - X8^{t+1}) \to \min \quad (9)$$

In this case, the operating point of the device that minimizes the electricity usage X1 so as to satisfy the above-explained formulae (4) to (8) is derived.

[Determination on Electricity Usage]

The electricity usage determiner 124 determines (step 14) whether the calculated electricity usage is lower than, or equal to or lower than a base line PBASE [kWh], or is equal to or larger than, or exceeds the base line.

(Determination on Acceptability)

When the electricity usage determiner 124 determines (step 14: YES) that the calculated electricity usage is lower than, or equal to or lower than the base line, the acceptance determiner 126 determines (step 15) that a receipt of the incentive is "possible" in the determination time.

When the electricity usage determiner 124 determines (step 14: NO) that the calculated electricity usage is equal to or larger than, or exceeds the base line, the allocation canceller 125 cancels (step 16) the current allocation of the heat dissipation quantity of the heat storage tank and the discharging quantity of the battery 100. Next, the acceptance determiner 126 determines (step 17) that an receipt of the incentive is "negative" in the determination time.

The completion determiner 127 determines (step 18) whether or not determination on all DR target times completes. When the completion determiner 127 determines (step 18: NO) that determination on all DR target times does not complete yet, a time with a high preference order at next is set as a determination time (step 12), and the operations subsequent to the step 13 as explained above are repeated.

When the completion determiner 127 determines (step 18: YES) that determination on all DR target times completes, the successive determining process by the incentive acceptance determiner 12 is terminated.

As explained above, through the successive operations of the incentive acceptance determiner 12, with respect to the DR target time, it becomes possible to determine the acceptability of the incentive in each time when the electricity usage is reduced maximally.

[Optimization of Electricity Suppression Schedule]

Figure 7:
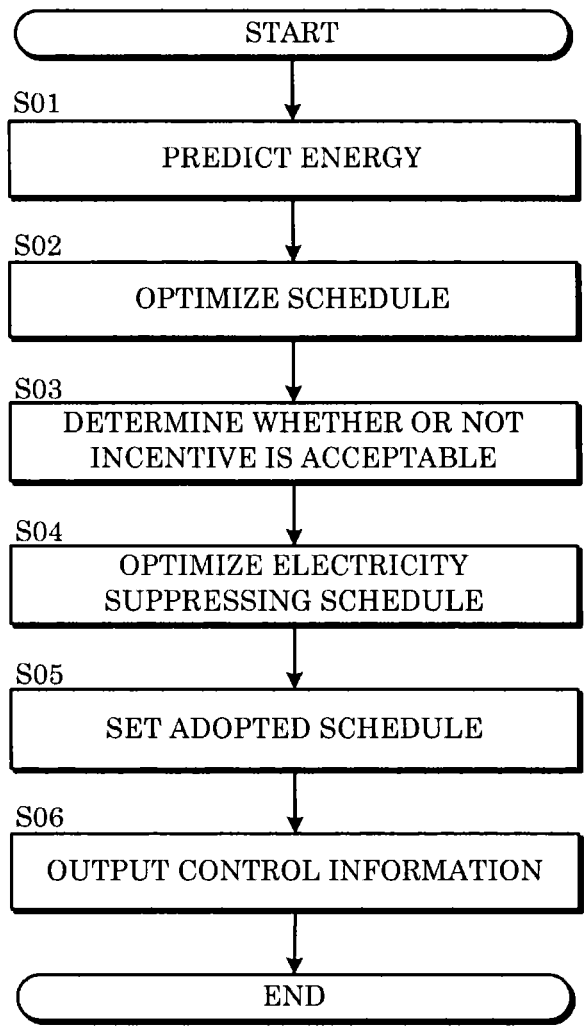
FIG. 7 is a flowchart illustrating a process procedure when a next-day schedule of the electricity and heat optimizing control device is planned.

Next, as illustrated in FIG. 7, the electricity suppressing schedule optimizer 13 performs (step 04) an optimization of the operating schedule in consideration of the incentive derived from an electricity suppression for a time which is determined that the incentive is receivable therein.

At this time, an electricity coefficient ECt [JP YEN/kWh] is changed as the following formula (10). In addition, the upper limit of the electricity usage X1 in such a time is changed to the base line.

ECHGt [JP YEN/kWh] in the formula (10) is the unit price of an electricity metered fee at a time t, and INCt [JP YEN/kWh] is the incentive unit price at the time t. Accordingly, the incentive unit price is taken into consideration with the electric utility fee. The operating schedule obtained at this stage will be referred to as a schedule (II) below.

$$E_C^t = E_{CHG}^t + INC \quad (10)$$

[Selection of Adopted Schedule]

The adopted schedule selector 14 selects (step 05), between the schedule (I) obtained by the schedule optimizer and the schedule (II) obtained by the electricity suppressing schedule optimizer 13, the operating schedule to be adopted.

That is, the adopted schedule selector 14 calculates a net electric utility fee and a net gas fee in a day within each of the schedule (I) and the schedule (II), and selects the smaller one. The selected schedule is set as the operating schedule actually applied.

[Output of Control Information]

Eventually, the control set value outputter 15 outputs (step 06) the control information including the control set value of the control-target device 2 and based on the operating schedule. Various output timings of the control information are possible. For example, the output timing is set as the day before the execution day of the operating schedule, and each local control device 3 stores the received control set value. Next, each local control device 3 executes a control on the execution day based on the control information. In addition, the current execution day itself of the operating schedule may be set as the output timing.

The optimized data memory 23 stores the value calculated through the successive processes like the obtained operating schedule. The above-explained operating flow is the operating flow of the electricity and heat optimizing control device 4 when the next-day operating schedule is optimized one day before.

The evaluation barometer to be minimized through the above-explained successive processes is costs. However, the evaluation barometer may be other than costs. For example, the evaluation barometer to be minimized may be $CO_2$, a peak electricity receiving quantity, consumed energy, etc. In addition, a composite barometer that is a combination of those barometers may be applied.

[4-5. When Schedule is Changed on Current Day]

As explained above, the control-target device 2 starts actual operation on the next day based on the operating schedule optimized at the night one day before.

Figure 11:
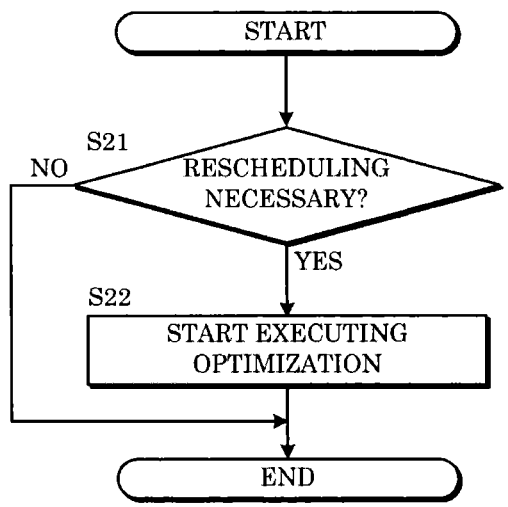
FIG. 11 is a flowchart illustrating a process procedure when a current-day rescheduling is performed.

In this case, an explanation will be given of an operation of the electricity and heat optimizing control device 4 that changes the schedule on the current day at which the control-target device 2 is operating with reference to the flowchart of FIG. 11. The basic process after the rescheduling starts is the same as the optimizing process performed at the night one day before, and thus the explanation thereof will be omitted.

After the operation of the control-target device 2 starts, the rescheduling necessity determiner 17 determines (step 21) whether or not a rescheduling is necessary at a predetermined timing. The determination is carried out through a cross-check of the operating schedule stored in the optimized data memory 23 with the operation data, etc., stored in the process data memory 22.

As a determination timing, the following examples can be set.

(1) Predetermined cycle (e.g., five minutes)
(2) When a request from the operator is input.
(3) When supplied energy or consumed energy of PV 101, etc., that is a prediction target sharply changes.
(4) When actual meteorological phenomenon condition (e.g., temperature, humidity, or weather) is inconsistent from the predicted meteorological phenomenon information or is changed therefrom rapidly.
(5) When the operating schedule output by the control information outputter 15 becomes mismatching with the actual operation of the device.
(6) When the incentive unit price associated with the DR, the DR target time, and the base line are changed.

There is a possibility that the incentive unit price also changes. That is, it is expected that an electric company suddenly changes the incentive unit price in a certain time on the current day at which the operating schedule is executed. In this case, the operating schedule is changed upon a change made by the electric company.

As data to be compared for the determination, for example, the followings are applicable.

(a) The actual value and predicted value of the supplied energy and the consumed energy
(b) The optimized operating schedule and the actual operating state of the device When the difference between the compared data does not exceed each threshold set in the process data memory 22 in advance, the rescheduling necessity processor 17 determines (step 21: NO) that the rescheduling is unnecessary. Conversely, when such difference exceeds the threshold, it is determined (step 21: YES) that the rescheduling is necessary.

As explained above, when the rescheduling necessity determiner 17 determines that the rescheduling is necessary, the start instructor 16 instructs (step 22) the start of an execution of rescheduling. Hence, as is illustrated in the flowchart of FIG. 9, the rescheduling starts.

Figure 9:
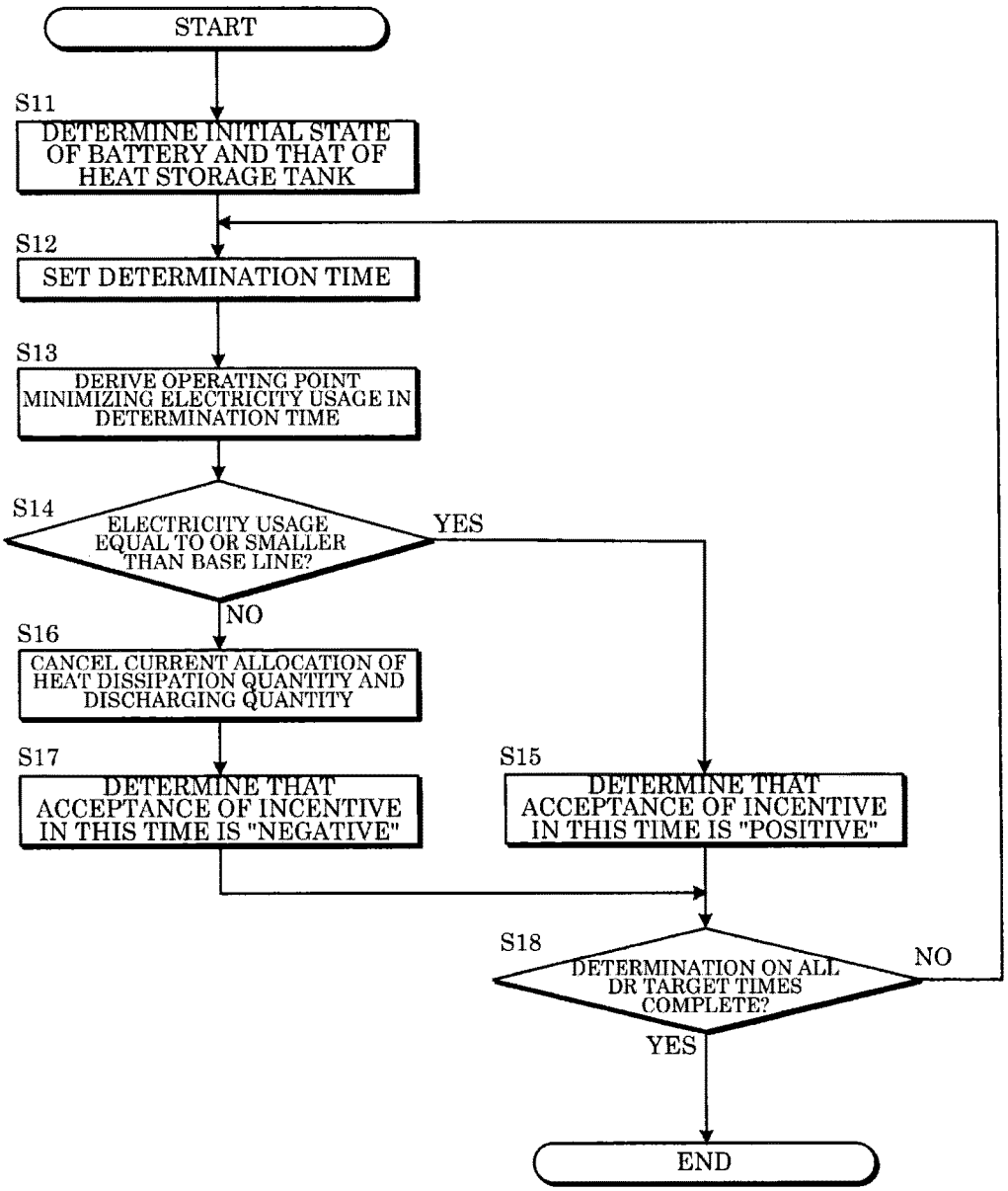
FIG. 9 is a flowchart illustrating a process procedure of determining whether or not an incentive is receivable.

In the operation in the step 11 in the flowchart of FIG. 9, with respect to the initial states of the SOC of the battery 100 and the remaining heat storage quantity of the heat storage tank 105, the current SOC and the current remaining heat storage quantity are set. The other operations are the same as those of the case in which the schedule is planned one day before as explained above.

5. Advantageous Effect

As explained above, according to this embodiment, a time at which the incentive is receivable is determined beforehand, and an operating schedule optimized with an electricity unit price reflecting the incentive only for such a time is derived. Hence, it is possible to obtain an appropriate DR operating schedule meeting the reality.

In addition, when a calculation in consideration of the incentive is performed, an optimizing calculation is performed based on a presumption that the unit price to the electricity usage is increased by what corresponds to the incentive unit price. Hence, it becomes unnecessary to perform a complex calculation through a strict formulation originating from a change in the electricity usage relative to the base line.

In addition, an operating schedule when optimization is performed without the incentive taken into consideration and an operation schedule when optimization is performed in consideration of the incentive are both calculated, and either one schedule with an excellent evaluation barometer is adopted. For example, the operating schedule with inexpensive costs is taken as the operating schedule actually applied, and thus an operating schedule that surely minimizes the costs can be obtained.

Still further, when the operating schedule becomes mismatching with the actual operating state, the operating schedule can be optimized again. Hence, an operating schedule further reflecting the reality can be obtained, and thus an additional energy obtainment can be suppressed as minimum as possible, and an efficient operation as a whole is enabled.

B. Second Embodiment

1. Configuration

The configuration of this embodiment is basically the same as that of the above-explained first embodiment. However, the preference order of the determination time determined by the determination time setter 122 in the incentive acceptance determiner 12 is different. That is, according to this embodiment, the determination time is set in an order that the value of the predicted electricity consuming energy predicted by the energy predictor 10 is smaller.

2. Action

The action of the above-explained this embodiment is basically the same as that of the above-explained first embodiment. When, however, the operating schedule is planned, in the step 12 in the flowchart of FIG. 9, the determination time setter 122 sets the determination time in an order that the predicted consumed energy set by the energy predictor 10 is smaller.

Figure 12:
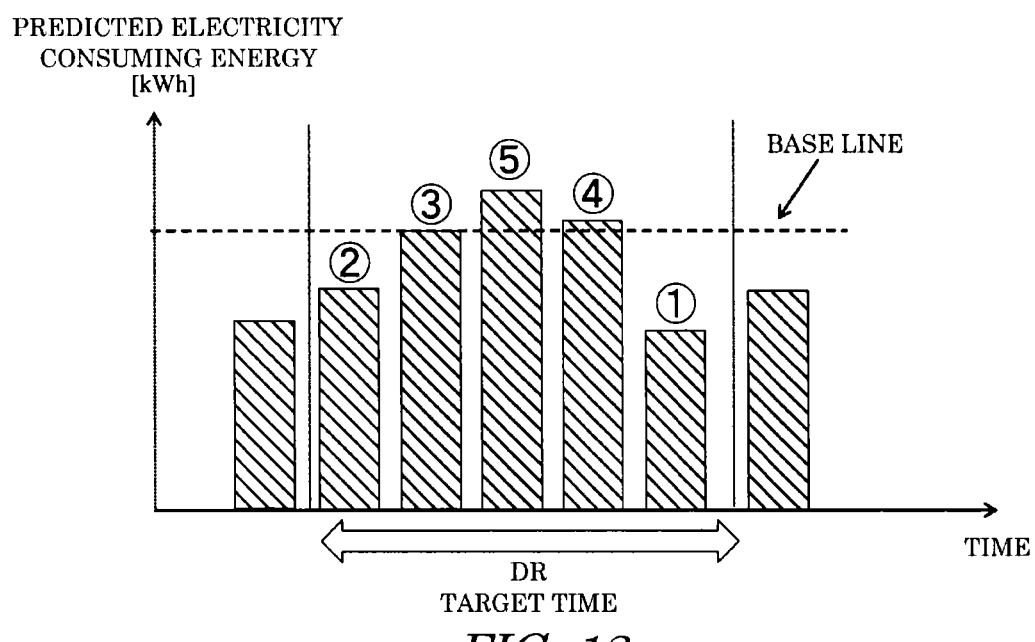
FIG. 12 is a diagram illustrating an example preference order of a determination time with respect to whether or not an incentive is receivable according to a second embodiment.

FIG. 12 illustrates an example preference order of the incentive acceptance determination time set in this manner. The smaller the number surrounded by a circle in the figure is, the higher the preference order is. The other operations are the same as those of the above-explained first embodiment, and thus the explanation thereof will be omitted.

3. Advantageous Effect

According to the above-explained this embodiment, times are subjected to a determination on whether or not the incentive is receivable in an order that the predicted electricity consuming energy obtained by the energy predictor 10 is smaller. Hence, it becomes possible to obtain a cost minimizing operating schedule which maximizes the incentive obtained through an electricity suppression.

That is, the load shift quantity through electricity and heat storage has a limit. Hence, when the electricity is preferentially reduced in a time at which the demand is originally little within the target times, it becomes possible to maximize the reduction range relative to the base line while suppressing the load shift quantity.

C. Third Embodiment

1. Configuration

Figure 13:
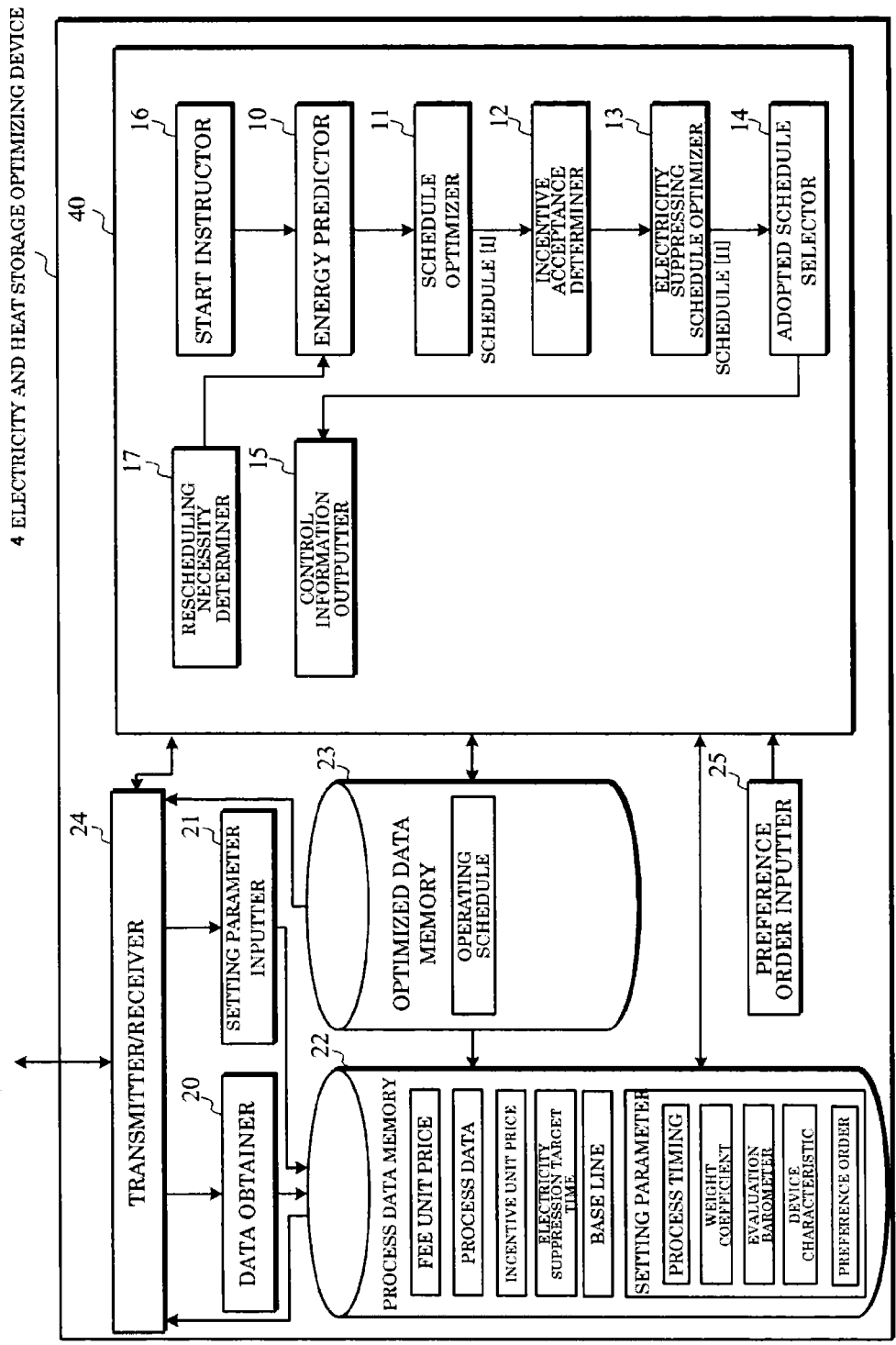
FIG. 13 is a block diagram illustrating a configuration of an electricity and heat optimizing control device according to a third embodiment.

The configuration of this embodiment is basically the same as that of the above-explained first embodiment. In this embodiment, however, as illustrated in FIG. 13, a preference order inputter 25 is provided. The preference order inputter 25 is a processor to input a preference order regarding at which time the user preferentially performs electricity suppression.

The preference order inputter 25 may be commonly implemented as the above-explained inputter. In addition, the preference order inputter 25 may be configured as a processing unit that accepts a preference order input through the transmitter/receiver 24 and sets the preference order in the process data memory 22. Still further, the input/output terminal of the user connected to the transmitter/receiver 24 via the network N is also included as the preference order inputter 25.

2. Action

The action of the above-explained this embodiment is basically the same as that of the above-explained first embodiment. When, however, an operating schedule is planned, in the step 12 in the flowchart of FIG. 9, the determination time setter 122 sets the determination time in an order in accordance with the preference order input by the user. The other operations are the same as those of the above-explained first embodiment, and thus the explanation thereof will be omitted.

3. Advantageous Effect

According to the above-explained this embodiment, the preference order inputter 25 enables inputting of the preference order of the determination time with respect to an incentive receipt. Hence, it becomes possible to obtain a cost minimizing operating schedule that suppresses an electricity at a time desired by the user.

That is, the user is allowed to select at which time an electricity suppression is preferentially performed. When it is desired to suppress an electricity maximally in a certain time due to some reasons, the preference order of that time becomes the highest. It becomes possible to cope with a unique circumstance that the same preference order is given when the other times are in the same order.

D. Fourth Embodiment

1. Configuration

The configuration of this embodiment is basically the same as that of the above-explained first embodiment. In this embodiment, however, when L-PTR type DR or CPP type DR is performed, an operating schedule can be optimized using necessary data.

Hence, according to this embodiment, the upper limit amount of the incentive in the case of the L-PTR type and the target value of the electricity reduction in the case of the CPP type are input through the data obtainer 20, and are set in the process data memory 22. In addition, a margin for an electricity usage is input through the setting parameter inputter 21, and is set in the process data memory 22.

According to this embodiment, the above-explained upper limit amount, target value, and the upper limit and lower limit values based on the margin are utilized for the processes by the incentive acceptance determiner 12 and the electricity suppressing schedule optimizer 13. The respective upper limits and lower limits of the L-PTR type and the CPP type are as follows.

When L-PTR type DR is performed:
Upper limit of electricity usage X1: base line
Lower limit of electricity usage X1: electricity usage that accomplishes the incentive upper limit amount
When CPP type DR is performed:
Upper limit of electricity usage X1: electricity usage that satisfies the electricity reduction target value (see the following formula (11)).
Lower limit of electricity usage X1: a value obtained by subtracting the margin from the above-explained upper limit (see the following formula (12))

The term margin means as follows. First of all, in the case of the CPP, even if it becomes lower than the base line, no incentive will be paid until when it further becomes lower than the target value. When it becomes lower than the target value, the incentive is paid by what corresponds to the reduction quantity from the base line to the target value. However, no incentive is paid by what corresponds to the reduction quantity lower than the target value. Hence, a further lower limit is set below the target value, and it is necessary to be lower than the target value but higher than such a lower limit. The range between the target value and the lower limit is the margin.

When no lower limit is set, even if it is lower than the target value, the electricity quantity is lowered in vain, and thus the lower limit is necessary to be set up as a stop point. When the electricity usage is set to be within the margin, the electricity is not suppressed in vain as the incentive is paid.

In addition, the electricity usage determiner 124 in the incentive acceptance determiner 12 according to this embodiment is a processing unit that determines whether or not the electricity usage can accomplish the upper limit. The acceptance determiner 126 is a processing unit that determines whether or not the incentive is receivable based on whether or not the electricity usage can accomplish the upper limit.

2. Action

The action of the above-explained this embodiment is basically the same as that of the above-explained first embodiment. In this embodiment, however, as is illustrated in the flowchart of FIG. 14, the determining process by the incentive acceptance determiner 12 has procedures partially different from those illustrated in FIG. 9.

Figure 14:
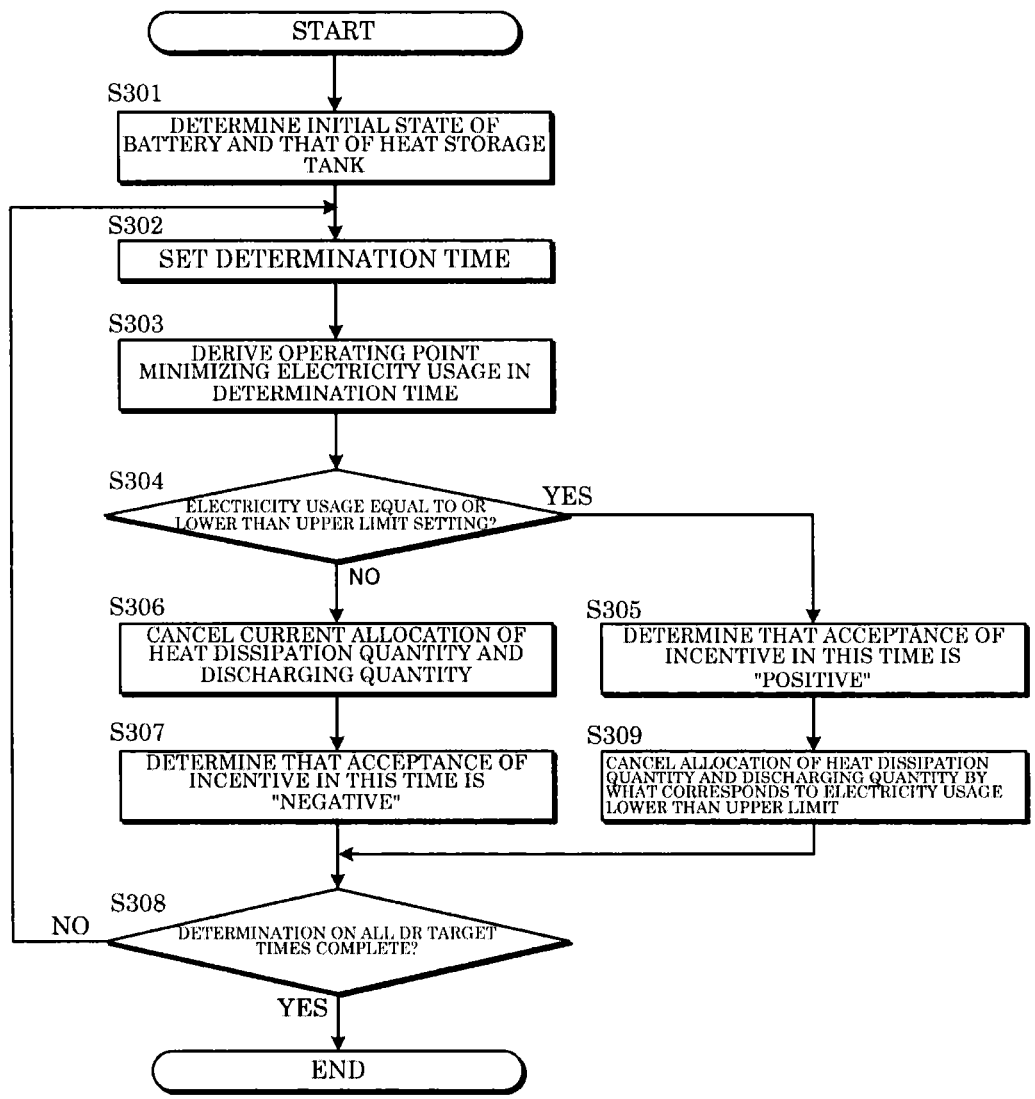
FIG. 14 is a flowchart illustrating a process procedure of determining whether or not an incentive is receivable according to a fourth embodiment.

First, in FIG. 14, setting of the initial state (step 301), setting of the determination time (step 302), and derivation of the operating point (step 303) are the same as those of the above-explained embodiment. Subsequently, in step 304, the electricity usage determiner 124 determines whether the electricity usage in the minimized time is equal to or lower than the upper limit or is lower than it.

The upper limit setting of the electricity usage in this case is, as explained above, a base line PBASE [kWh] when the L-PTR type DR is performed. In addition, when the CPP type DR is performed, the upper limit setting is an electricity usage PUB [kWh] that satisfies an electricity reduction target value $\Delta PL$ [kWh] indicated in the following formula (11).

$$P_{UB} = P_{BASE} - \Delta P_L \qquad (11)$$

When the electricity usage determiner 124 determines (step 304: NO) that the electricity usage is not equal to or lower than the upper limit or is not lower than it, the allocation canceller 125 cancels (step 306) the currently allocated heat dissipation quantity and discharging quantity. Next, the acceptance determiner 126 determines (step 307) that the receipt of the incentive is "negative" in the corresponding time.

When the electricity usage determiner 124 determines (step 304: YES) that the electricity usage is equal to or lower than the upper limit setting or is lower than it, the acceptance determiner 126 determines (step 305) that the incentive is receivable in the corresponding time.

Next, the allocation canceller 125 cancels (step 309) the allocation of the heat dissipation quantity and the discharging quantity by what corresponds to the electricity usage lower than the upper limit setting. This operation is to effectively utilize the heat dissipation quantity of the heat storage tank and the discharging quantity of the battery 100 by what corresponds to the electricity usage lower than the upper limit at a determination time in the next or following order.

When the completion determiner 127 determines (step 308: NO) that determination on all DR target times does not complete yet, a time with the next high preference order is set as the determination time (step 302), and the operations subsequent to the steps 303 are repeated as explained above.

When the completion determiner 127 determines (step 308: YES) that determination on all DR target times completes, the determining process by the incentive acceptance determiner 12 is terminated.

Next, the electricity suppressing schedule optimizer 13 changes, in the incentive acceptance determiner 12, the electricity coefficient ECt [JP YEN/kWh] of the time determined that the incentive is receivable to be one in accordance with the formula (10), sets the upper limit and the lower limit of the electricity usage X1 as explained above, thereby performing optimization of the operating schedule in consideration of the incentive. The following operations are the same as those of the above-explained first embodiment, and thus the explanation thereof will be omitted.

3. Advantageous Effect

According to the above-explained this embodiment, the upper limit and the lower limit of the electricity usage are set in a time which is determined that the target electricity usage can be accomplished, and thus an excessive electricity suppression within a range where no incentive is created becomes avoidable. In addition, a cost minimizing operation schedule can be obtained in accordance with the L-PTR type or CPP type DR.

E. Fifth Embodiment

1. Configuration

Figure 15:
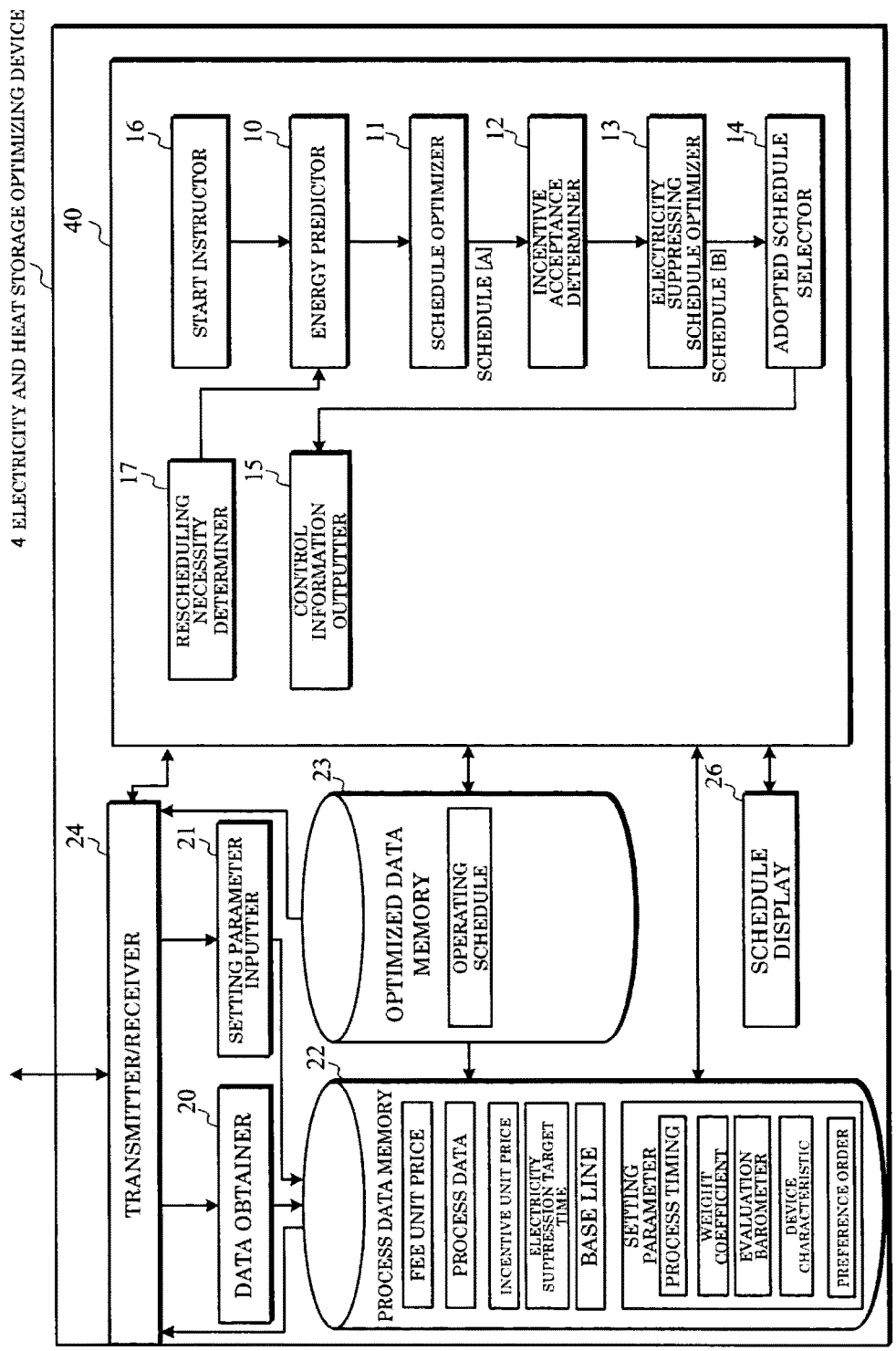
FIG. 15 is a block diagram illustrating a configuration of an electricity and heat optimizing control device according to a fifth embodiment.

FIG. 15 illustrates a configuration according to this embodiment. This embodiment is basically the same as the above-explained first embodiment. According to this embodiment, however, a schedule display 26 is additionally provided. The schedule display 26 may be commonly the above-explained outputter. In addition, the schedule display 26 includes the input/output terminal of the user connected to the transmitter/receiver 24 via the network.

The adopted schedule selector 14 in this embodiment does not select the operating schedule based on the above-explained references, but is set to select the operating schedule selected by the user through the schedule display 26. That is, the schedule display 26 also functions as an instruction inputter to input a schedule selecting instruction.

2. Action

The action of this embodiment explained above is basically the same as that of the above-explained first embodiment. However, before the adopted schedule selector 14 selects the operating schedule, the schedule display 26 displays thereon the operating schedule having the incentive obtained by the optimizing processor 40 not taken into consideration and the operating schedule having the incentive taken into consideration to allow the user to view those schedules.

Figure 16:
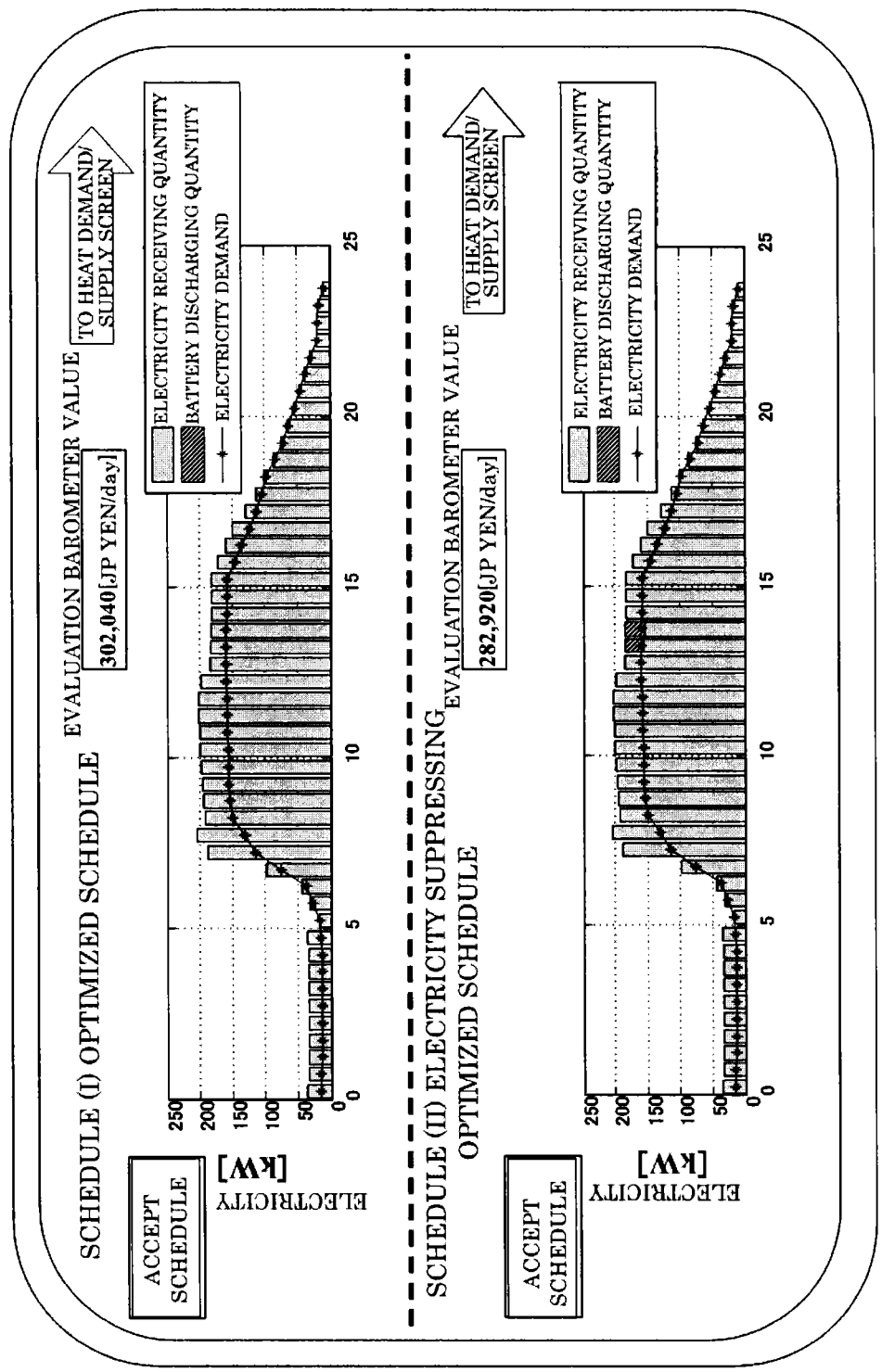
FIG. 16 is a diagram illustrating an example operating schedule presenting screen.

For example, FIG. 16 illustrates an example screen displayed on the display screen of the schedule display 26. The upper part of FIG. 16 is the operating schedule (I) optimized without considering an incentive. The lower part of FIG. 16 is the operating schedule (II) optimized with the incentive taken into consideration.

The respective operating schedules have, together with an evaluation barometer value, an electricity demand, an electricity receiving quantity, and a battery discharging quantity for each time slot, displayed as graphs. In addition, as the instruction inputter, a schedule accepting button and a transition button to a heat demand/supply screen are also displayed.

The user to whom the operating schedules are presented determines which operating schedule is suitably applicable. Next, the user selects the accepting button for the determined operating schedule to instruct the adopted schedule selector 14 to select the adopted schedule. Accordingly, the operating schedule selected by the user is set as the operating schedule to be executed.

3. Advantageous Effect

As explained above, according to this embodiment, the operator can check both of the operating schedule optimized without an incentive taken into consideration and the operating schedule optimized with the incentive taken into consideration in advance. Accordingly, it becomes possible for the operator to determine which operating schedule should be accepted in accordance with the evaluation barometer value to make an instruction.

F. Other Embodiments

The embodiment is not limited to the above-explained ones.

(1) The control-target device is not limited to the above-explained examples. For example, as the energy supplying device, instead of or in addition to the solar energy generation facilities and the solar water heater, an installation that changes an output in accordance with a meteorological phenomenon condition like wind generation facilities may be applicable. Note that this embodiment is suitable for a BEMS (Building Energy Management System) that is a system managing the control-target device installed in a predetermined architecture like a building. However, the installation place of the control-target device is not limited to a single architecture or multiple architectures, and may include the exterior. That is, this embodiment is widely applicable to an EMS (Energy Management System) that controls the control-target device installed in a predetermined area.

(2) The electricity and heat optimizing control device, the local control device, the terminal, etc., can be realized by a computer including a CPU and the like and controlled under a predetermined program. The program in this case physically utilizes the hardware of the computer to realize the above-explained processes of the respective processors.

A method for executing the above-explained processes of the respective processors, a program, and a recording medium storing such a program are also embodiments of the present disclosure. In addition, how to set the process range by the hardware and the process range by a software including the program is not limited to any particular one. For example, any one of the above-explained processors may be formed as a circuit that realizes each process.

(3) The above-explained respective processors, memories, etc., may be realized on a common computer or may be realized on multiple computers connected together via a network. For example, the process data memory and the optimized data memory may be realized on a server device connected with the optimizing processor via a network.

Figure 17:
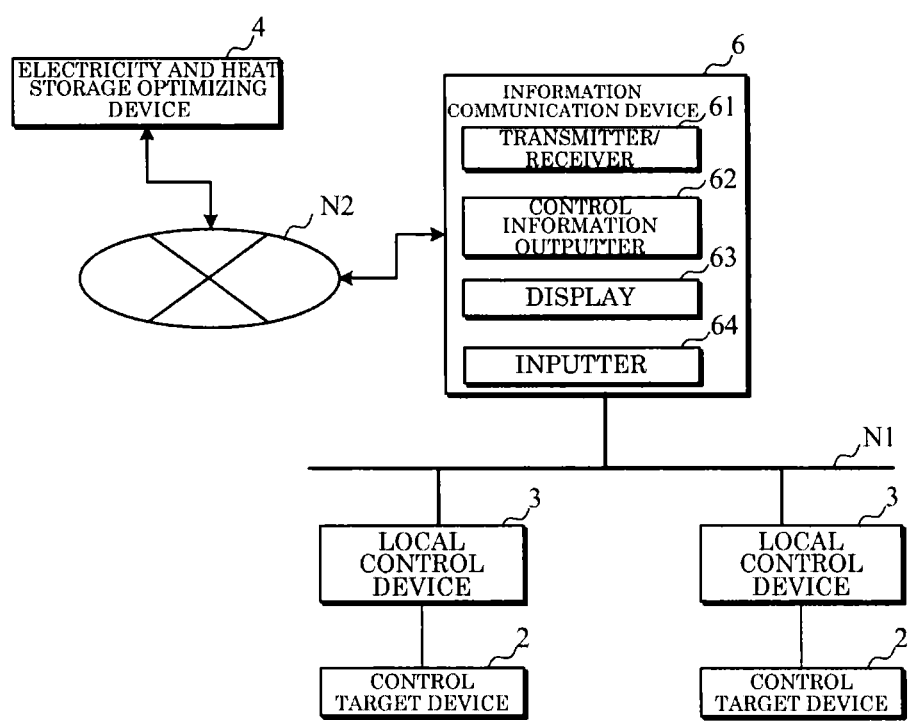
FIG. 17 is a block diagram illustrating another embodiment.

Still further, as illustrated in FIG. 17, a configuration may be employed in which an information communication device 6 provided in an architecture where the control-target device 2 is installed is connected with the electricity and heat optimizing control device 4 installed remotely via a network N2. The information communication device 6 may be a personal computer, a control panel, etc.

The information communication device 6 includes, for example, a transmitter/receiver 61, a control information outputter 62, and a display 63. The transmitter/receiver 61 is a processing unit that exchanges information with the electricity and heat optimizing control device 4. For example, the transmitter/receiver 61 can receive an operating schedule containing control information from the electricity and heat optimizing control device 4, and transmit a selection instruction of a preference order and an operating schedule to the electricity and heat optimizing control device 4.

The control information outputter 62 is a processing unit that outputs the control information to the local control device 3 connected via the network N2. The display 63 is a processing unit that displays the received operating schedule, etc., containing the control information. An inputter 64 is a processing unit that inputs the selection instruction, etc., of the preference order and the operating schedule. The display 63 and the inputter 64 have functions as the above-explained schedule display 26 and the preference order inputter 25.

Still further, the consumer's end can employ a configuration in which only a receiver that receives the control information output by the electricity and heat optimizing control device 4 is present, and the local control device 3 is controlled based on the control information received by the receiver.

As explained above, like a cloud computing, etc., a configuration that realizes the electricity and heat optimizing control device 4 using a single or multiple servers at remote locations from the control-target device 2 via the network is also an embodiment of the present disclosure. Accordingly, the facilities at the consumer's end can be simplified, the installation costs can be reduced, thereby prompting a popularization.

(4) The memory areas of respective data stored in the process data memory and the optimized data memory can be configured as a memory area for each data. Such memory areas can be configured by, typically, internal or externally-connected various memories, a hard disk, etc. However, as the memory, all memory media available currently or in future are applicable. A register, etc., for a calculation can be also deemed as a memory. A storing scheme is not limited to a scheme of storing data non-transitory, but also includes a scheme of storing data transitory for a process and erasing or updating within a short time.

(5) The specific detail and value of information utilized in the embodiments are optional, and are not limited to specific detail and value. In the embodiments, with respect to a large/small determination and a matching/mismatching condition relative to a threshold, it is optional to determine so as to include a value such as equal to or greater than and equal to or smaller than, or to determine so as to exclude the value such as larger than, smaller than, exceeds, does not exceed, above, below, and less than. Hence, depending on the setting of a value, for example, there is no substantial difference when "equal to or greater than" is interpreted as "larger than", "exceeds", and "above", and, "equal to or smaller than" is interpreted as "smaller than", "does not exceed", "below", and "less than".

(6) While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

REFERENCE SIGNS LIST

1 Architecture
2 Control-target device
3 Local control device
4 Electricity and heat optimizing control device
5 Electricity and heat storage optimizing system
6 Information communication device
10 Energy predictor
10*a* Similarity calculator
10*b* Similar day extractor
10*c* Prediction value setter
11 Schedule optimizer
12 Incentive acceptance determiner
13 Electricity suppressing schedule optimizer
14 Adopted schedule selector
15, 62 Control information outputter
16 Start instructor
17 Rescheduling necessity determiner
20 Data obtainer
21 Setting parameter inputter
22 Process data memory
23 Optimized data memory
24, 61 Transmitter/receiver
25 Preference order inputter
26 Schedule display
40 Optimizing processor
63 Display
64 Inputter
100 Battery
101 PV
102 CGS
103 Electric freezer
104 Absorption water cooler/heater
105 Heat storage tank
110 Room
111 Air conditioner
121 Initial state determiner
122 Determination time setter
123 Operating point deriver
124 Electricity usage determiner
125 Allocation canceller
126 Acceptance determiner
127 Completion determiner

The invention claimed is:

1. An electricity suppressing type electricity and heat optimizing control device comprising:

an energy predictor configured to set, for at least one of control-target devices which are an energy supplying device supplying energy, an energy consuming device consuming energy, and an energy storing device storing energy, a predicted value of consumed energy of the energy consuming device or of supplied energy of the energy supplying device within a predetermined future time period;

an incentive acceptance determiner configured to determine a time that an incentive is receivable by a reduction of electricity usage based on the predicted value, an electricity suppression target time that is a time prepared for applying an incentive to electricity suppression, and a base line that is a threshold for whether or not to apply the incentive;

an electricity suppressing schedule optimizer configured to plan the operating schedule of the control-target device within the predetermined future time period so as to minimize a predetermined evaluation barometer that is a required cost for an energy when the control-target device is activated based on the predicted value, a characteristic of the control-target device, and a unit price of an energy usage fee which is increased so as to reduce a possibility to be selected by adding an incentive unit price to the unit price of an energy usage fee at a time at which incentive is determined receivable;

a schedule optimizer configured to plan an operating schedule of the control-target device within the predetermined future time period so as to minimize the predetermined evaluation barometer based on the predicted value, the characteristic of the control-target device, and the unit price of an energy usage fee without the incentive;

an adopted schedule selector configured to select either the operating schedule planned by the electricity suppressing schedule optimizer or the operating schedule planned by the schedule optimizer based on the predetermined evaluation barometer or a selection instruction input externally; and a rescheduling necessity determiner configured to determine whether or not it is necessary to optimize the operating schedule again based on the operating schedule, and operation data of the control-target device operated based on the operating schedule.

2. The electricity suppressing type electricity and heat optimizing control device according to claim 1, further comprising a control information outputter configured to output control information on the control-target device based on the operating schedule selected by the adopted schedule selector.

3. The electricity suppressing type electricity and heat optimizing control device according to claim 1, further comprising a preference order memory configured to store a preference order of a time at which the determination by the incentive acceptance determiner as to whether or not the incentive is receivable is preferably determined.

4. The electricity suppressing type electricity and heat optimizing control device according to claim 3, wherein with respect to the preference order, the larger the predicted value of energy predicted by the energy predictor is, the higher the preference order of the time is.

5. The electricity suppressing type electricity and heat optimizing control device according to claim 3, wherein with respect to the preference order, the smaller the predicted value of energy predicted by the energy predictor is, the higher the preference order of the time is.

6. The electricity suppressing type electricity and heat optimizing control device according to claim 3, further comprising a preference order inputter configured to input the preference order.

7. The electricity suppressing type electricity and heat optimizing control device according to claim 1, wherein:
the incentive acceptance determiner is configured to determine a time with a possibility that the incentive is receivable based on an upper limit that is the highest electricity amount from the usage electricity which permits a receipt of the incentive; and
the electricity suppressing schedule optimizer is configured to plan the operating schedule of the control-target device for a time at which the incentive is receivable based on the upper limit and a lower limit that is the lowest electricity amount from the usage electricity which permits a receipt of the incentive.

8. The electricity suppressing type electricity and heat optimizing control device according to claim 1, further comprising a schedule display configured to display the operating schedule optimized by the schedule optimizer, and the operating schedule optimized by the electricity suppressing schedule optimizer.

9. The electricity suppressing type electricity and heat optimizing control device according to claim 1, further comprising an instruction inputter configured to input an instruction for selecting either the operating schedule optimized by the schedule optimizer or the operating schedule optimized by the electricity suppressing schedule optimizer.

10. An electricity suppressing type electricity and heat storage optimizing method causing a computer or an electric circuit to execute:

an energy predicting process for setting, for at least one of control-target devices which are an energy supplying device supplying energy, an energy consuming device consuming energy, and an energy storing device storing energy, a predicted value of consumed energy of the energy consuming device or of supplied energy of the energy supplying device within a predetermined future time period;

an incentive acceptance determining process for determining a time that an incentive is receivable by a reduction of electricity usage based on the predicted value, an electricity suppression target time that is a time prepared for applying an incentive to electricity suppression, and a base line that is a threshold for whether or not to apply the incentive;

an electricity suppressing schedule optimizing process for planning the operating schedule of the control-target device within the predetermined future time period so as to minimize a predetermined evaluation barometer that is a required cost for an energy when the control-target device is activated based on the predicted value, a characteristic of the control-target device, and a unit price of an energy usage fee which is increased so as to reduce a possibility to be selected by adding an incentive unit price to the unit price of an energy usage fee at a time at which incentive is determined receivable;

a schedule optimizing process for planning an operating schedule of the control-target device within the predetermined future time period so as to minimize the predetermined evaluation barometer based on the predicted value, the characteristic of the control-target device, and the unit price of an energy usage fee without the incentive;

an adopted schedule selecting process for selecting either the operating schedule planned through the electricity suppressing schedule optimizing process or the operating schedule planned through the schedule optimizing process based on the predetermined evaluation barometer or a selection instruction input externally; and a rescheduling necessity determining process for determining whether or not it is necessary to optimize the operating schedule again based on the operating schedule, and operation data of the control-target device operated based on the operating schedule.

11. A computer readable non-transitory recording medium having stored therein an optimizing program for an electricity suppressing type electricity and heat storage that causes a computer to execute:

an energy predicting process for setting, for at least one of control-target devices which are an energy supplying device supplying energy, an energy consuming device consuming energy, and an energy storing device storing energy, a predicted value of consumed energy of the energy consuming device or of supplied energy of the energy supplying device within a predetermined future time period;

an incentive acceptance determining process for determining a time that an incentive is receivable by a reduction of electricity usage based on the predicted value, an electricity suppression target time that is a time prepared for applying an incentive to electricity suppression, and a base line that is a threshold for whether or not to apply the incentive;

an electricity suppressing schedule optimizing process for planning the operating schedule of the control-target device within the predetermined future time period so as to minimize a predetermined evaluation barometer that is a required cost for an energy of when the control-target device is activated based on the predicted value, a characteristic of the control-target device, and a unit price of an energy usage fee which is increased so as to reduce a possibility to be selected by adding an incentive unit price to the unit price of an energy usage fee at a time at which incentive is determined receivable;

a schedule optimizing process for planning an operating schedule of the control-target device within the predetermined future time period so as to minimize the predetermined evaluation barometer based on the predicted value, the characteristic of the control-target device, and the unit price of an energy usage fee without the incentive;

an adopted schedule selecting process for selecting either the operating schedule planned through the electricity suppressing schedule optimizing process or the operating schedule planned through the schedule optimizing process based on the predetermined evaluation barometer or a selection instruction input externally; and a rescheduling necessity determining process for determining whether or not it is necessary to optimize the operating schedule again based on the operating schedule, and operation data of the control-target device operated based on the operating schedule.

* * * * *